(12) United States Patent
Kim et al.

(10) Patent No.: US 9,203,464 B2
(45) Date of Patent: Dec. 1, 2015

(54) COMMUNICATION APPARATUS AND COMMUNICATION METHOD IN WIRELESS POWER TRANSMISSION SYSTEM

(75) Inventors: Nam Yun Kim, Seoul (KR); Sang Wook Kwon, Seongnam-si (KR); Yun Kwon Park, Dongducheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 695 days.

(21) Appl. No.: 13/603,826

(22) Filed: Sep. 5, 2012

(65) Prior Publication Data

US 2013/0058380 A1 Mar. 7, 2013

(30) Foreign Application Priority Data

Sep. 5, 2011 (KR) .................. 10-2011-0089396
Oct. 27, 2011 (KR) .................. 10-2011-0110531

(51) Int. Cl.
*H04B 1/707* (2011.01)
*H04W 16/14* (2009.01)
*H04W 24/00* (2009.01)
*H04W 72/08* (2009.01)
*H04W 76/02* (2009.01)

(52) U.S. Cl.
CPC .............. *H04B 1/707* (2013.01); *H04W 16/14* (2013.01); *H04W 24/00* (2013.01); *H04W 72/085* (2013.01); *H04W 76/023* (2013.01)

(58) Field of Classification Search
CPC ...... H04B 1/707; H02W 16/14; H02W 24/00; H02W 72/085; H02W 76/023
USPC ........................................ 307/104
See application file for complete search history.

(56) References Cited

U.S. PATENT DOCUMENTS

| 2009/0042595 A1 | 2/2009 | Yavuz et al. |
| 2011/0021153 A1 | 1/2011 | Safavi |
| 2011/0080896 A1 | 4/2011 | Krishnamurthy et al. |

(Continued)

FOREIGN PATENT DOCUMENTS

| KR | 10-2010-0029245 A | 3/2010 |
| KR | 10-2011-0009228 A | 1/2011 |

(Continued)

OTHER PUBLICATIONS

International Search Report issued Feb. 27, 2013 in counterpart International Application No. PCT/KR2012/006479 (5 pages in English).

*Primary Examiner* — Hal Kaplan
(74) *Attorney, Agent, or Firm* — NSIP Law

(57) ABSTRACT

An apparatus and method for performing communication in a wireless power transmission system are provided. The apparatus includes a channel search unit configured to search for communication channels other than a channel used in wireless power transmission, and measure state information of the communication channels. The apparatus includes a channel determining unit configured to determine a communication channel available for communication with a target device based on the measured state information. The apparatus includes a communication unit configured to transmit an access instruction to the target device using the determined communication channel. The apparatus includes a controller configured to determine whether to communicate with the target device using the determined communication channel based on whether a response signal corresponding to the access instruction is received.

36 Claims, 30 Drawing Sheets

(56) References Cited

U.S. PATENT DOCUMENTS

| | | |
|---|---|---|
| 2011/0127843 A1 | 6/2011 | Karaoguz et al. |
| 2011/0127952 A1 | 6/2011 | Walley et al. |
| 2011/0142150 A1 | 6/2011 | Anigstein et al. |
| 2011/0154087 A1 | 6/2011 | Craine |

FOREIGN PATENT DOCUMENTS

| | | |
|---|---|---|
| KR | 10-2011-0026205 A | 3/2011 |
| KR | 10-2011-0050396 A | 5/2011 |
| KR | 10-2011-0069890 A | 6/2011 |

COMMUNICATION APPARATUS AND COMMUNICATION METHOD IN WIRELESS POWER TRANSMISSION SYSTEM

CROSS-REFERENCE TO RELATED APPLICATION(S)

This application claims the benefit under 35 U.S.C. §119 (a) of Korean Patent Application No. 10-2011-0089396, filed on Sep. 5, 2011, and Korean Patent Application No. 10-2011-0110531, filed on Oct. 27, 2011, in the Korean Intellectual Property Office, the entire disclosures of which are each incorporated herein by reference for all purposes.

BACKGROUND

1. Field

The following description relates to an apparatus and method for performing communication in a wireless power transmission system.

2. Description of Related Art

Research on wireless power transmission have been started to overcome the increasing inconvenience of wired power supplies, and the limited capacity of conventional batteries, due to the increasing number of various electronic devices including electric vehicles and mobile devices. One wireless power transmission technology uses resonance characteristics of radio frequency (RF) devices.

For example, a wireless power transmission system using resonance characteristics may include a source device configured to supply a power, and a target device configured to receive supplied power. To efficiently transmit power from the source device to the target device, the source device and the target device may need to exchange information on a state of the source device, and information on a state of the target device, with each other. In other words, there is a demand to perform communication between the source device and the target device.

SUMMARY

In one general aspect, there is provided a communication apparatus in a wireless power transmission system, the communication apparatus including a channel search unit configured to search for communication channels other than a channel used in wireless power transmission, and measure state information of the communication channels. The communication apparatus further includes a channel determining unit configured to determine a communication channel available for communication with a target device based on the measured state information. The communication apparatus further includes a communication unit configured to transmit an access instruction to the target device using the determined communication channel. The communication apparatus further includes a controller configured to determine whether to communicate with the target device using the determined communication channel based on whether a response signal corresponding to the access instruction is received.

The communication apparatus may be configured to detect the target device in a wireless power transmission region of the communication apparatus.

The channel search unit may include a channel measuring unit configured to measure intensities of interference signals of the respective communication channels.

The channel measuring unit may be further configured to measure the intensities for a predetermined period of time.

The channel determining unit may be further configured to determine a communication channel including an intensity of an interference signal that is less than or equal to a predetermined value, among the measured intensities, to be the communication channel available for communication with the target device.

The channel determining unit may be further configured to determine a communication channel including an intensity of an interference signal that is lowest in value, among the measured intensities, to be the communication channel available for communication with the target device if each of the intensities are greater than or equal to a channel selection reference level.

The communication unit may be further configured to transmit a channel seizure signal to the target device, the channel seizure signal including a predetermined intensity.

The channel seizure signal may be a continuous wave (CW) signal including a predetermined intensity and a power greater than a communication signal of a direct-sequence spread spectrum (DSSS).

The controller may be further configured to assign a control identifier (ID) to the target device if the response signal is received.

The communication unit may be further configured to transmit a signal to request information on a power required by the target device using a communication frequency of the determined communication channel.

The controller may be further configured to determine an amount of a wireless power to be transmitted by the communication apparatus based on the information regarding the power required by the target device. The controller may be further configured to control a wireless power output from the communication apparatus based on the determined amount of the wireless power.

The channel search unit may be further configured to search for the communication channels based on a search table set based on a type of the communication apparatus, or a unique ID assigned to the communication apparatus.

The controller may be further configured to control the channel search unit to search for the communication channels, regardless of whether the target device is waked up.

The controller may be further configured to determine whether the communication apparatus is accessed by the target device based on information on a power of a communication output of the communication apparatus in the determined communication channel, and information on a power of the communication output received by the target device.

The controller may be further configured to control the channel search unit to search for the communication channels based on a channel search start command if the communication apparatus is not accessed by the target device. The controller may be further configured to control the channel search unit to search for the communication channels based on an amount of a change in a current output from the communication apparatus if the communication apparatus is accessed by the target device.

The controller may be further configured to determine a difference between a wireless power transmitted by the communication apparatus and a power transferred to a load of the target device. The controller may be further configured to determine whether the target device incorrectly accesses the communication apparatus based on the determined difference.

The controller may be further configured to determine a difference between a time in which an amount of a wireless power transmitted by the communication apparatus is changed to a predetermined value, and a time in which an amount of a power transferred to a load of the target device is changed. The controller may be further configured to determine whether the target device incorrectly accesses the communication apparatus based on the determined difference.

The controller may be further configured to determine a power of a communication output in the determined communication channel based on a table to which an intensity of an interference signal in the determined communication channel, and a power of an output signal required to transmit data within a predetermined error range, are mapped.

The controller may be further configured to determine a time required to measure intensities of interference signals of the respective communication channels.

The controller may be further configured to determine to change the determined communication channel to another communication channel if an error in the determined communication channel between the communication apparatus and the target device is greater than a predetermined value, or if an intensity of an interference signal of the determined communication channel is greater than a predetermined value. The controller may be further configured to transmit a channel change request instruction to the target device.

In another general aspect, there is provided a communication apparatus in a wireless power transmission system, the communication apparatus including a channel search unit configured to search for communication channels other than a channel used in wireless power transmission, and measure state information of the communication channels. The communication apparatus further includes a channel determining unit configured to determine a communication channel available for communication with a source device based on the measured state information. The communication apparatus further includes a controller configured to determine whether to communicate with the source device using the determined communication channel based on whether an access instruction is received from the source device using the determined communication channel.

The controller may be further configured to determine whether the access instruction is received from the source device using the determined communication channel within a reference time.

The communication apparatus may further include a communication unit configured to transmit, to the source device, a response signal corresponding to the access instruction if the access instruction is received within the reference time.

The communication unit may be further configured to receive, from the source device, a control ID assigned to the communication apparatus and that corresponds to the response signal.

The channel search unit may be further configured to search for another communication channel, and measure state information of the other communication channel, if the access instruction is not received within the reference time.

The channel search unit may be further configured to measure intensities of channel seizure signals of the respective communication channels that are transmitted by the source device. The channel determining unit may be further configured to determine a communication channel including an intensity of a channel seizure signal that is greater than a predetermined value, among the intensities, to be the communication channel available for communication with the source device.

The communication apparatus may be configured to receive channel seizure signals from source devices. The controller may be further configured to select one of the source devices using a communication channel including an intensity of a channel seizure signal that is greatest in value, from among the source devices, and determine to receive a wireless power from the selected one of the source devices.

The channel determining unit may be further configured to determine the communication channel used by the selected one of the source devices to be a communication channel available for communication with the selected one of the source devices.

The channel search unit may be further configured to search for the communication channels based on a search table set based on a type of the communication apparatus, or a unique ID assigned to the communication apparatus.

The communication apparatus may further include a direct current (DC)-to-DC (DC/DC) converter. The communication apparatus may further include a load. The controller may be further configured to determine a power required by the communication apparatus based on a power measured at an input end of the DC/DC converter, a power measured at an output end of the DC/DC converter, and a power transferred to the load.

In still another general aspect, there is provided a communication method in a wireless power transmission system, the communication method including searching for communication channels other than a channel used in wireless power transmission. The communication method further includes measuring state information of the communication channels. The communication method further includes determining a communication channel available for communication with a target device based on the measured state information. The communication method further includes transmitting an access instruction to the target device using the determined communication channel. The communication method further includes determining whether to communicate with the target device using the determined communication channel based on whether a response signal corresponding to the access instruction is received.

The communication method may further include transmitting a channel seizure signal to the target device, the channel seizure signal including a predetermined intensity.

The measuring of the state information may include measuring intensities of interference signals of the respective communication channels.

The determining of the communication channel may include determining a communication channel including an intensity of an interference signal that is less than or equal to a predetermined value, among the measured intensities, to be the communication channel available for communication with the target device.

In yet another general aspect, there is provided a communication method in a wireless power transmission system, the communication method including searching for communication channels other than a channel used in wireless power transmission. The communication method further includes measuring state information of the communication channels. The communication method further includes determining a communication channel available for communication with a source device based on the measured state information. The communication method further includes determining whether to communicate with the source device using the determined communication channel based on whether an access instruction is received from the source device using the determined communication channel.

Other features and aspects will be apparent from the following detailed description, the drawings, and the claims.

Figure 1:
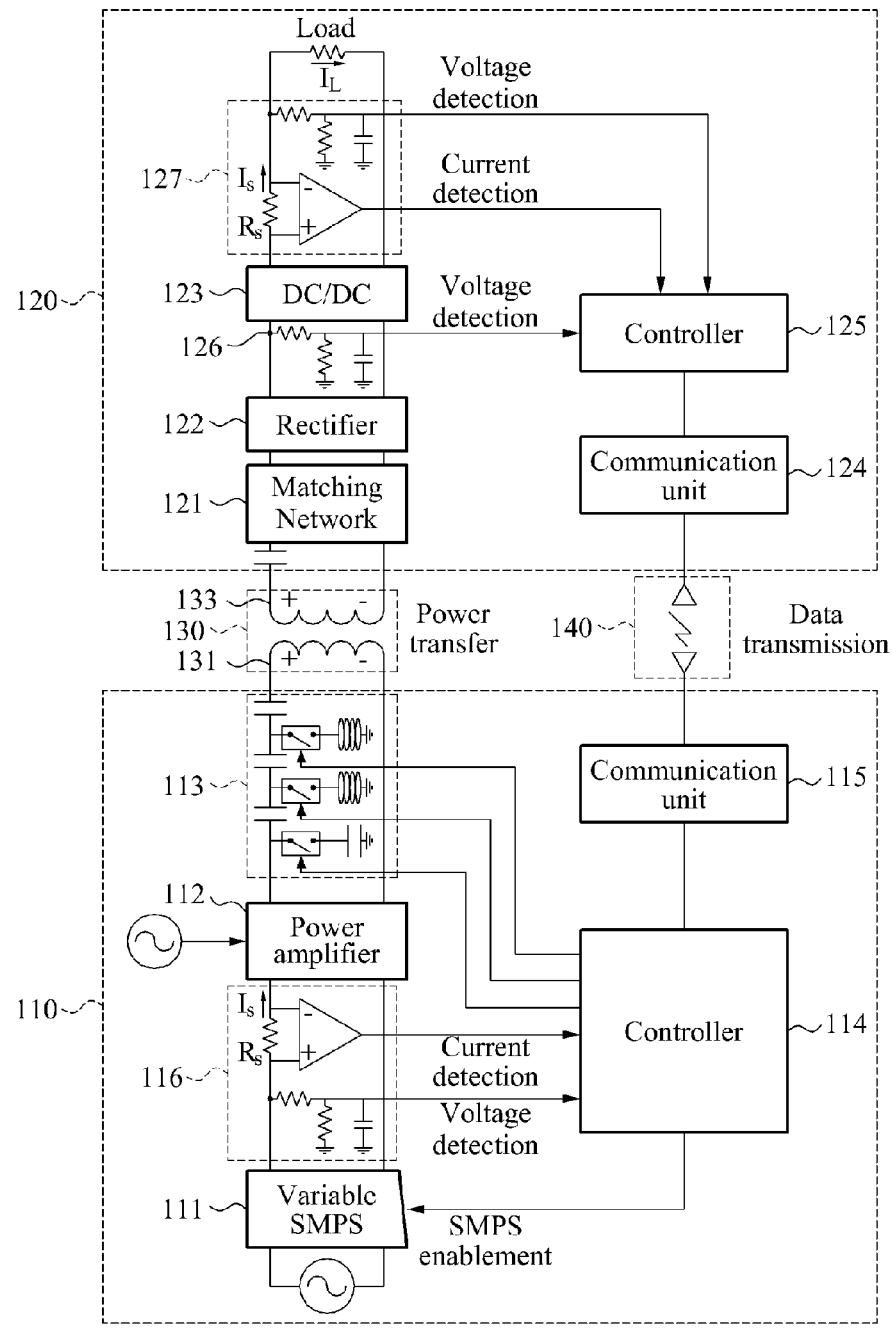
FIG. 1 is a diagram illustrating an example of a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

A scheme of performing communication between a source device and a target device includes an in-band communication scheme and an out-band communication scheme. The in-band communication scheme refers to communication performed between the source device and the target device in the same frequency band as used for power transmission. The out-band communication scheme refers to communication performed between the source device and the target device in a separate frequency band than used for power transmission.

FIG. 1 illustrates an example of a wireless power transmission system. The wireless power transmission system includes a source 110 and a target 120. The source 110 refers to a device configured to supply a wireless power, and may include all electronic devices enabling power supply, for example, a pad, a terminal, a television (TV), and/or other electronic devices known to one of ordinary skill in the art. The target 120 refers to a device configured to receive the supplied wireless power, and may include all electronic devices requiring power, for example, a terminal, a TV, a vehicle, a washing machine, a radio, an electric light, and/or other electronic devices known to one of ordinary skill in the art.

The source 110 includes a variable switching mode power supply (SMPS) 111, a power amplifier 112, a matching network 113, a controller 114, a communication unit 115, and a power detector 116. The variable SMPS 111 switches alternating current (AC) voltage in a band of tens of hertz (Hz) output from a power supply to generate direct current (DC) voltage. The variable SMPS 111 may output the DC voltage of a predetermined level, or may adjust an output level of the DC voltage based on a control of the controller 114.

A power detector 116 detects an output current and an output voltage of the variable SMPS 111, and transfers, to the controller 114, information on the detected current and the detected voltage. Additionally, the power detector 116 may detect an input current and an input voltage of the power amplifier 112.

The power amplifier 112 converts the DC voltage to an AC voltage based on a switching pulse signal in a band of a few megahertz (MHz) to tens of MHz to generate a power. For example, the power amplifier 112 may convert the DC voltage supplied to the power amplifier 112 to the AC voltage based on a reference resonance frequency $F_{Ref}$, and may generate a communication power used for communication, and/or a charging power used to charge. The communication power and the charging power may be used in target devices.

The communication power may refer to a low power of 0.1 milliwatt (mW) to 1 mW. The charging power may refer to a high power of 1 mW to 200 W that is consumed in a device load of a target device. In various examples described herein, the term "charging" may refer to supplying power to a unit or element that is configured to charge power. Additionally, the term "charging" may refer to supplying power to a unit or element that is configured to consume power. The units or elements may include, for example, batteries, displays, sound output circuits, main processors, various sensors, and or other units or elements known to one of ordinary skill in the art.

Also, the term "reference resonance frequency" may refer to a resonance frequency used by the source 110. Additionally, the term "tracking frequency" may refer to a resonance frequency adjusted by a preset scheme.

The controller 114 detects a reflected wave of the communication power and/or the charging power, and may detect mismatching that may occur between a target resonator 133 and a source resonator 131 based on the detected reflected wave. To detect the mismatching, for example, the controller 114 may detect an envelope of the reflected wave, a power amount of the reflected wave, and/or other values known to one of ordinary skill in the art.

The matching network 113 compensates for impedance mismatching between the source resonator 131 and the target resonator 133 to be optimal matching, under the control of the controller 114. The matching network 113 may be connected through a switch, including a combination of a capacitor and an inductor, under the control of the controller 114.

The controller 114 determines a voltage standing wave ratio (VSWR) based on a voltage level of the reflected wave, and an output voltage of the source resonator 131 or the power amplifier 112. For example, if the VSWR is less than a predetermined value, the controller 114 determines that mismatching is detected.

In this example, the controller 114 determines a power transmission efficiency for each of N tracking frequencies, determines a tracking frequency $F_{Best}$ with the best power transmission efficiency among the N tracking frequencies, and adjusts the reference resonance frequency $F_{Ref}$ to the tracking frequency $F_{Best}$. In various examples, the N tracking frequencies may be set in advance.

The controller 114 adjusts a frequency of the switching pulse signal. Under the control of the controller 114, the frequency of the switching pulse signal is determined. For example, by controlling the power amplifier 112, the controller 114 may generate a modulation signal to be transmitted to the target 120. In other words, the communication unit 115 may transmit a variety of data 140 to the target 120 using the in-band communication. The controller 114 may detect a reflected wave, and may demodulate a signal received from the target 120 through an envelope of the detected reflected wave.

The controller 114 may generate the modulation signal for the in-band communication based on various ways. For example, the controller 114 may generate the modulation signal by turning on and off the switching pulse signal, by performing delta-sigma modulation, and/or other types of methods known to one of ordinary skill in the art. Additionally, the controller 114 may generate a pulse-width modulation (PWM) signal with a predetermined envelope.

The communication unit 115 may perform out-band communication employing a communication channel. The communication unit 115 may include a communication module, such as, for example, one configured to process ZigBee, Bluetooth, and/or other communication protocols known to one of ordinary skill in the art. The communication unit 115 may transmit the data 140 to the target 120 through the out-band communication.

The source resonator 131 transfers an electromagnetic energy 130 to the target resonator 133. For example, the source resonator 131 may transfer the communication power and/or the charging power to the target 120 based on magnetic coupling with the target resonator 133.

The target 120 includes a matching network 121, a rectification unit 122, a DC-to-DC (DC/DC) converter 123, a communication unit 124, and a controller 125, and a power detector 127. The target resonator 133 receives the electromagnetic energy 130 from the source resonator 131. For example, the target resonator 133 may receive the communication power and/or charging power from the source 110 based on the magnetic coupling with the source resonator 131. Additionally, the target resonator 133 may receive the data 140 from the source 110 using the in-band communication.

The matching network 121 matches an input impedance viewed from the source 110 to an output impedance viewed from a load of the target 120. The matching network 121 may be configured with a combination of a capacitor and an inductor.

The rectification unit 122 rectifies an AC voltage to generate a DC voltage. The AC voltage may be received from the target resonator 133.

The DC/DC converter 123 adjusts a level of the DC voltage output from the rectification unit 122, based on a capacity required by the load. For example, the DC/DC converter 123 may adjust the level of the DC voltage output from the rectification unit 122 from 3 volts (V) to 10 V.

The power detector 127 detects a voltage of an input terminal 126 of the DC/DC converter 123, and a current and a voltage of an output terminal of the DC/DC converter 123. The detected voltage of the input terminal 126 is used to determine a transmission efficiency of the power received from the source 110. Additionally, the detected current and the detected voltage of the output terminal is used by the controller 125 to determine an amount of a power transferred to the load. The controller 114 of the source 110 determines an amount of a power to be transmitted by the source 110 based on a power required by the load and the power transferred to the load. If the power of the output terminal is transferred to the source 110 using the communication unit 124, the source 110 may determine the amount of the power to be transmitted.

The communication unit 124 may perform in-band communication to transmit and receive data based on a resonance frequency. During the in-band communication, the controller 125 detect a signal between the target resonator 133 and the rectification unit 122, or detect an output signal of the rectification unit 122, to demodulate the detected signal. In other words, the controller 125 may demodulate a message received using the in-band communication. Additionally, the controller 125 may adjust an impedance of the target resonator 133 using the matching network 121 to modulate a signal to be transmitted to the source 110. For example, the controller 125 may increase the impedance of the target resonator 133 so that a reflected wave may be detected by the controller 114 of the source 110. Depending on whether the reflected wave is detected, the controller 114 may detect a binary number, for example, "0" or "1".

The communication unit 124 may transmit a response message to the communication unit 115 of the source 110. For example, the response message may include a type of a corresponding target (e.g., the target 120), information about a manufacturer of a corresponding target, a model name of a corresponding target, a battery type of a corresponding target, a scheme of charging a corresponding target, an impedance value of a load of a corresponding target, information on characteristics of a target resonator (e.g., the target resonator 133) of a corresponding target, information on a frequency band used by a corresponding target, an amount of a power consumed by a corresponding target, an identifier (ID) of a corresponding target, information on version or standard of a corresponding target, and/or other information known to one of ordinary skill in the art.

The communication unit 124 may perform out-band communication using a communication channel. For example, the communication unit 124 may include a communication module, such as, for example, one configured to process ZigBee, Bluetooth, and/or other communication protocols known to one of ordinary skill in the art. The communication unit 124 may transmit and receive the data 140 to and from the source 110 using the out-band communication.

The communication unit 124 receives a wake-up request message from the source 110, and the power detector 127 detects an amount of a power received at the target resonator 133. The communication unit 124 transmits, to the source 110, information on the detected amount of the power. Information on the detected amount may include, for example, an input voltage value and an input current value of the rectification unit 122, an output voltage value and an output current value of the rectification unit 122, an output voltage value and an output current value of the DC/DC converter 123, and/or other values known to one of ordinary skill in the art.

The controller 114 sets a resonance bandwidth of the source resonator 131. Based on the setting of the resonance bandwidth of the source resonator 131, a Q-factor of the source resonator 131 may be determined.

Additionally, the controller 125 sets a resonance bandwidth of the target resonator 133. Based on the setting of the resonance bandwidth of the target resonator 133, a Q-factor of the target resonator 133 may be determined. For example, the resonance bandwidth of the source resonator 131 may be set to be wider or narrower than the resonance bandwidth of the target resonator 133.

The source 110 and the target 120 communicate with each other to share information on the resonance bandwidth of the source resonator 131 and the resonance bandwidth of the target resonator 133. In an example in which a power desired or required by the target 120 is greater than a reference value, the Q-factor of the source resonator 131 may be set to a value greater than "100". In another example in which the power desired or required by the target 120 is less than the reference value, the Q-factor of the source resonator 131 may be set to a value less than "100".

In a wireless power transmission employing a resonance scheme, the resonance bandwidth is a factor. A Q-factor Qt may consider a change in a distance between the source resonator 131 and the target resonator 133, a change in a resonance impedance, impedance mismatching, a reflected signal, and/or other values known to one of ordinary skill in the art. In this example, the Q-factor Qt may include an inverse-proportional relationship with the resonance bandwidth, as given in the example of Equation 1.

$$\frac{\Delta f}{f_0} = \frac{1}{Qt} \qquad \text{[Equation 1]}$$
$$= \Gamma_{S,D} + \frac{1}{BW_S} + \frac{1}{BW_D}$$

In Equation 1, $f_0$ denotes a central frequency, $\Delta f$ denotes a bandwidth, $\Gamma_{S,D}$ denotes a reflection loss between the source resonator 131 and the target resonator 133, $BW_S$ denotes the resonance bandwidth of the source resonator 131, and $BW_D$ denotes the resonance bandwidth of the target resonator 133.

An efficiency U of a wireless power transmission may be defined, as given in the example of Equation 2.

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_K} \qquad \text{[Equation 2]}$$

In Equation 2, $\kappa$ denotes a coupling coefficient of energy coupling between the source resonator 131 and the target resonator 133, $\Gamma_S$ denotes a reflection coefficient in the source resonator 131, $\Gamma_D$ denotes a reflection coefficient in the target resonator 133, $\omega_0$ denotes a resonance frequency, M denotes a mutual inductance between the source resonator 131 and the target resonator 133, $R_S$ denotes an impedance of the source resonator 131, $R_D$ denotes an impedance of the target resonator 133, $Q_S$ denotes the Q-factor of the source resonator 131, $Q_D$ denotes the Q-factor of the target resonator 133, and $Q_K$ denotes a Q-factor of the energy coupling between the source resonator 131 and the target resonator 133.

Referring to Equation 2, the Q-factors may include high relevance to the efficiency of the wireless power transmission. Accordingly, to increase the efficiency of the wireless power transmission, the Q-factors may be set to high values. However, even if the Q-factors $Q_S$ and $Q_D$ are set to extremely high values, the efficiency of the wireless power transmission may be decreased due to a change in the coupling coefficient $\kappa$, the change in the distance between the source resonator 131 and the target resonator 133, the change in the resonance impedance, impedance mismatching, and/or other values known to one of ordinary skill in the art.

Additionally, to increase the efficiency of the wireless power transmission, the resonance bandwidth of the source resonator 131, and the resonance bandwidth of the target resonator 133, may be set to be excessively narrow. However, in this example, impedance mismatching and/or other issues known to one of ordinary skill in the art may occur due to even a small external effect. Considering the impedance mismatching, Equation 1 may be represented as given in the example of Equation 3.

$$\frac{\Delta f}{f_0} = \frac{\sqrt{VSWR} - 1}{Qt\sqrt{VSWR}} \qquad \text{[Equation 3]}$$

In an example in which an unbalanced relationship of a resonance bandwidth, or a bandwidth of an impedance matching frequency, between the source resonator 131 and the target resonator 133 is maintained, a decrease in efficiency of the wireless power transmission may be prevented due to the change in the coupling coefficient κ, the change in the distance between the source resonator 131 and the target resonator 133, the change in the resonance impedance, impedance mismatching, and/or other values known to one of ordinary skill in the art. In an example in which the unbalanced relationship of the resonance bandwidth, or the bandwidth of the impedance matching frequency, between the source resonator 131 and the target resonator 133 is maintained, based on Equations 1 and 3, an unbalanced relationship between the Q-factors $Q_S$ and $Q_D$ may also be maintained.

Figure 2:
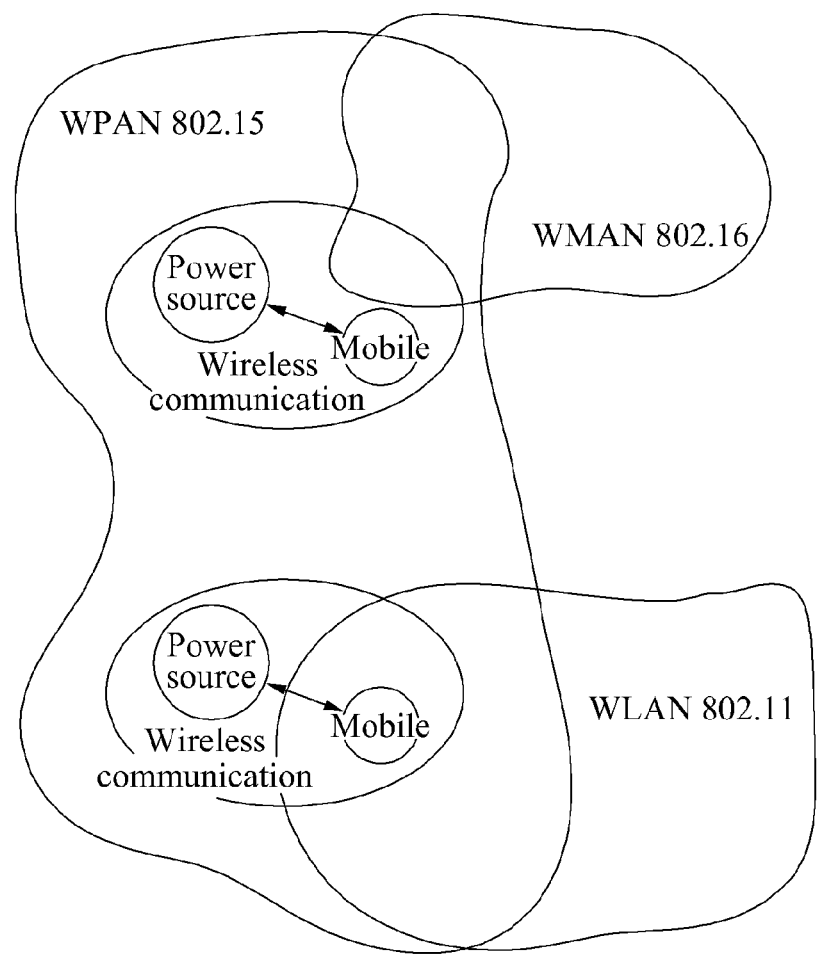
FIG. 2 is a diagram illustrating an example of an environment in which a wireless power transmission system is exposed to different wireless communication schemes.

FIG. 2 illustrates an example of an environment in which a wireless power transmission system is exposed to different wireless communication schemes. The wireless power transmission system includes a power source device and a mobile device. The power source device and the mobile device perform wireless communication in the environment enabling the communication in an industrial, scientific, medical (ISM) band. The ISM band may refer to a band of 2.4 gigahertz (GHz). The ISM band may be used in a IEEE 802.11 wireless local area network (WLAN) ("WLAN 802.11"), a IEEE 802.15 wireless personal area network (WPAN) ("WPAN 802.15"), and a IEEE 802.16 wireless metropolitan area network (WMAN) ("WMAN 802.16").

When the power source device and the mobile device communicate with each other in the ISM band, interference of radio waves may be caused by different types of wireless communication apparatuses using the WLAN 802.11, the WPAN 802.15, and/or the WMAN 802.16. Accordingly, a communication error between the power source device and the mobile device may occur, and a communication speed may be decreased. Furthermore, it may be difficult to control the wireless power transmission system. In other words, if different types of wireless electronic devices communicate with each other, frequency interference may occur in the wireless power transmission system.

Figure 3:
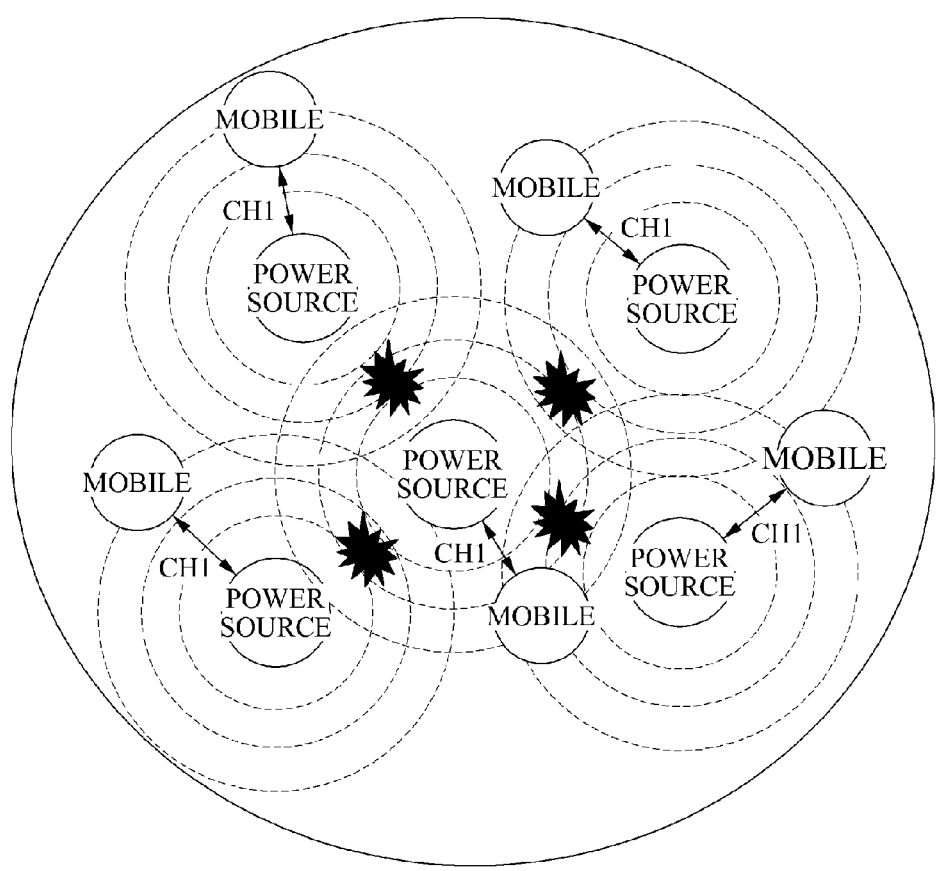
FIG. 3 is a diagram illustrating an example of an environment in which wireless power transmission systems perform communication using the same channel.

FIG. 3 illustrates an example of an environment in which wireless power transmission systems perform communication using the same channel. Each of the wireless power transmission systems includes a power source device and a mobile device. For example, when power source devices communicate with mobile devices using the same channel (e.g., a channel CH1), frequency interference may occur. In more detail, in a region in which the channel CH1 is available, the power source devices are spaced apart from each other by a predetermined distance, and share the same channel CH1. If a power source device and/or a mobile device approaches within the predetermined distance, frequency interference may occur between the power source devices, and between the mobile device and another power source device.

Figure 4:
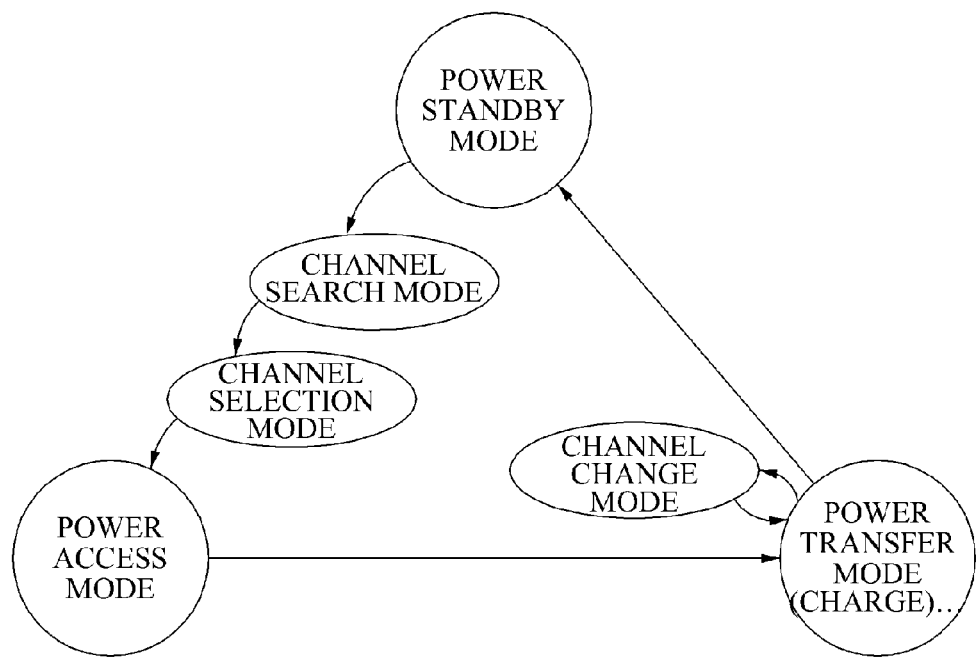
FIG. 4 is a diagram illustrating an example of an operating mode of a communication apparatus in a wireless power transmission system.

FIG. 4 illustrates an example of an operating mode of a communication apparatus in a wireless power transmission system. The communication apparatus includes a source device and a target device. The communication apparatus operates in three modes in the wireless power transmission system. The three modes include, for example, a power standby mode, a power access mode, and a power transfer mode (namely, a power charge mode).

The power standby mode refers to a mode in which a communication channel is not connected between an initialized source device and an initialized target device. For example, when power is supplied, the source device performs basic hardware initialization, reads information from a system configuration block (SCB) of the source device, and initializes system information. The system information may include, for example, a serial number of the source device, a maximum number of target devices accessible to the source device, a power transmission parameter, a communication channel parameter, and/or other information known to one of ordinary skill in the art.

When a wake-up power is received from the source device, that is, when a power required to control a system is supplied to the target device, the target device performs basic hardware initialization. Subsequently, the target device may read a serial number of the target device, a battery type, a power transmission parameter, a communication channel parameter, and/or other information known to one of ordinary skill in the art, from an SCB of the target device, and initializes system information. The SCB may refer to a memory configured to support at least 8 bytes, and a capacity of the SCB may be determined based on an improvement of a function of each of the source device and the target device, a type of the source device, and/or a type of the target device.

In the power standby mode, the source device determines whether a charge command is received at the source device. For example, if a start button is input, the charge command is received. In another example, if a target device located within a predetermined distance from the source device is detected, the charge command is automatically received. The source device further determines states of all channels available for communication. For example, the source device measures a level of a received signal strength indication (RSSI) for each channel, and determines whether each channel is available based on the RSSI.

In the power standby mode, the target device searches for channels available for communication. For example, the target device may measure an RSSI, or a link quality indicator (LQI), of a channel. In this example, if the measured RSSI or the measured LQI is greater than or equal to a predetermined value, the target device determines whether a preset packet is received via the channel within a predetermined period of time. If the measured RSSI or the measured LQI is less than the predetermined value, the target device searches for a next channel.

A channel search mode and a channel selection mode are applied while the power standby mode transitions to the power access mode. For example, when a target device is located within a power transmission distance of the source device, the source device searches for a channel enabling communication with the target device. In this example, the source device is operated in the channel search mode. In the channel selection mode, the source device selects, as a communication channel, a channel satisfying a set condition, from among channels enabling communication with the target device, and shares the selected channel with the target device.

If the charge command is received, the source device is operated in the power access mode. If the source device is already accessed by a target device, the source device may detect a level of a reflected wave. If the level of the reflected wave includes a predefined value, the source device determines that another target device exists, and is operated in the power access mode.

If a target device is detected first, or if the charge command is received, the source device transmits the wake-up power via a power transmission channel. The source device may measure an RSSI or LQI in the communication channel enabling communication with the target. If the RSSI or LQI is measured to be greater than or equal to a reference value, the communication channel is determined to be a currently-used channel, and the source device continues to search for a next channel until a channel with an RSSI or LQI including a value less than the reference value is found. When the channel is found, the source device may fix the found channel, and transmits an access standard instruction, based on a reference in the found channel. When target devices respond to the access standard instruction, the source device assigns control identifiers (IDs) to the target devices in an order that the target devices respond to the access standard instruction.

When at least one target device is connected to the source device, the source device transmits a wake-up power via the power transmission channel. The source device may transmit an access standard instruction to an additionally detected target using the communication channel already determined. If the additionally detected target device responds to the access standard instruction, the source device may assign control IDs to the target devices in an order that the target devices respond to the access standard instruction.

For example, the source device may assign control IDs "1" to "N" to the target devices in an ascending order. In this example, "N" indicates a maximum number of target devices accessible to the source device. When a low control ID assigned to a target device is empty due to completion of charging of the target device, or separation of the target device from the wireless power transmission system, the source device may assign the low control ID to a new target device accessing the source device. For example, if three target devices are chargeable by the source device, control IDs "1" and "2" are assigned, and a target device with the control ID "1" is separated from the wireless power transmission system, the source device may assign the control ID "1", instead of a control ID "3", to a new target device accessing the source device.

When a control ID is assigned to a target device, the source device is operated in the power transmission mode. The source receives information on a power required by the target device from the target device. The information on the required power may be stored in an SCB of the target device. The power transmission mode may be defined to be set in a period from a point in time in which the source device transmits a power, to a point in time in which a battery of the target device is completely charged and a charge control port of the target device is blocked. In the power transmission mode, the source device may regularly receive information on a state of the target device, a voltage and a current of an input end of the target device, and/or a voltage and a current of an output end of the target device, based on rules defined in advance for each product and for each model. The source device may perform a control operation based on the received information.

An operation of the target device may be reset based on a reset instruction to prevent malfunction of the target device. The malfunction of the target may include, for example, an incorrect access to a source, overheating, abnormality in charging, and/or issues known to one of ordinary skill in the art. In more detail, the target device may include a separate port to perform an appropriate operation if the target is overheated, and/or if the input end and the output end of the target are abnormally-operated. For example, if an abnormality occurs, the target device transmits information on the abnormality, while requesting a state of the source device. The target device may verify a temperature, a charging voltage, and/or a supplied power, regardless of the source device, and may terminate charging through a separate processing path.

In another example, if no response is received from the target device, or if a checksum error in a signal transmitted by the source occurs at least a predetermined number of times, the source device changes a currently used communication channel. In this example, the source device is operated in a channel change mode.

Figure 5:
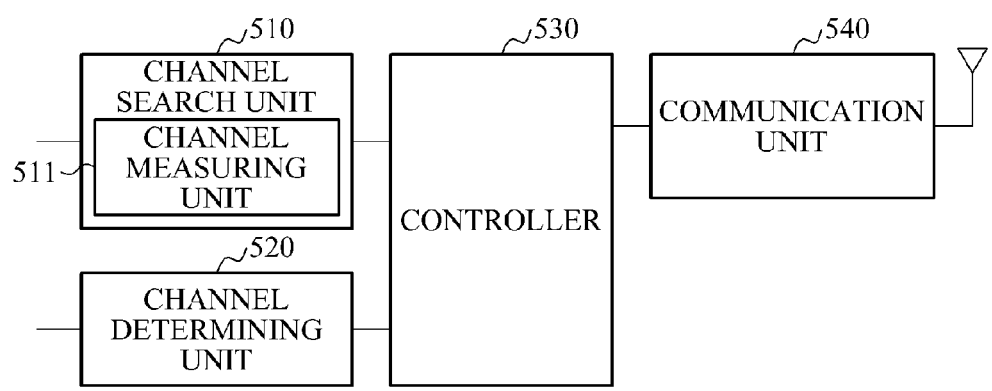
FIG. 5 is a block diagram illustrating an example of a communication apparatus in a wireless power transmission system.

FIG. 5 illustrates an example of a communication apparatus 500 in a wireless power transmission system. The communication apparatus 500 includes a channel search unit 510, a channel determining unit 520, a controller 530, and a communication unit 540. The communication apparatus 500 of FIG. 5 may correspond to a source device in the wireless power transmission system.

The channel search unit 510 searches for communication channels. The communication channels may be different from a channel used in wireless power transmission. The source device may transmit a power using a wireless power transmission channel, and may transmit and receive data using a communication channel. The communication channels may be channels in an ISM band.

The channel search unit 510 selects an n-th channel, as a first target to be searched for, from among searchable channels. For example, channels may be searched for in a descending order, in an ascending order, or in a random order.

The channel search unit 510 may search for communication channels based on a search table. The search table may be set differently based on a type of the source device or a unique ID assigned to the source device. The channel search unit 510 may search for communication channels in different orders for each type of the source device, as illustrated in the example of Table 1. In an example in which the source device corresponds to a type 1, the channel search unit 510 sequentially searches for 16 channels. In another example in which the source device corresponds to a type 5, the channel search unit 510 sequentially searches for the 16 channels from a channel 2.

TABLE 1

| | | Search table (16 channels, 1~16) | | | | | | | | | | | | | | | |
|---|---|---|---|---|---|---|---|---|---|---|---|---|---|---|---|---|---|
| Type of source or unique ID assigned to source | Type1 | 1 | 2 | 3 | 4 | 5 | 6 | 7 | 8 | 9 | 10 | 11 | 12 | 13 | 14 | 15 | 16 |
| | Type2 | 4 | 5 | 6 | 7 | 8 | 9 | 10 | 11 | 12 | 13 | 14 | 15 | 16 | 1 | 2 | 3 |
| | Type3 | 10 | 11 | 12 | 13 | 14 | 15 | 16 | 1 | 2 | 3 | 4 | 5 | 6 | 7 | 8 | 9 |
| | Type4 | 7 | 8 | 9 | 10 | 11 | 12 | 13 | 14 | 15 | 16 | 1 | 2 | 3 | 4 | 5 | 6 |
| | Type5 | 2 | 3 | 4 | 5 | 6 | 7 | 8 | 9 | 10 | 11 | 12 | 13 | 14 | 15 | 16 | 1 |
| | Type6 | 14 | 15 | 16 | 1 | 2 | 3 | 4 | 5 | 6 | 7 | 8 | 9 | 10 | 11 | 12 | 13 |
| | Type7 | 9 | 10 | 11 | 12 | 13 | 14 | 15 | 16 | 1 | 2 | 3 | 4 | 5 | 6 | 7 | 8 |
| | Type8 | 16 | 1 | 2 | 3 | 4 | 5 | 6 | 7 | 8 | 9 | 10 | 11 | 12 | 13 | 14 | 15 |
| | Type9 | 12 | 13 | 14 | 15 | 16 | 1 | 2 | 3 | 4 | 5 | 6 | 7 | 8 | 9 | 10 | 11 |
| | Type10 | 6 | 7 | 8 | 9 | 10 | 11 | 12 | 13 | 14 | 15 | 16 | 1 | 2 | 3 | 4 | 5 |
| | Type11 | 5 | 6 | 7 | 8 | 9 | 10 | 11 | 12 | 13 | 14 | 15 | 16 | 1 | 2 | 3 | 4 |
| | Type12 | 11 | 12 | 13 | 14 | 15 | 16 | 1 | 2 | 3 | 4 | 5 | 6 | 7 | 8 | 9 | 10 |
| | Type13 | 8 | 9 | 10 | 11 | 12 | 13 | 14 | 15 | 16 | 1 | 2 | 3 | 4 | 5 | 6 | 7 |
| | Type14 | 13 | 14 | 15 | 16 | 1 | 2 | 3 | 4 | 5 | 6 | 7 | 8 | 9 | 10 | 11 | 12 |
| | Type15 | 15 | 16 | 1 | 2 | 3 | 4 | 5 | 6 | 7 | 8 | 9 | 10 | 11 | 12 | 13 | 14 |
| | Type16 | 3 | 4 | 5 | 6 | 7 | 8 | 9 | 10 | 11 | 12 | 13 | 14 | 15 | 16 | 1 | 2 |

The channel search unit 510 measures state information of one or more communication channels. The state information may include information on whether the communication channels are used by other source devices and/or different types of communication apparatuses.

For example, the channel search unit 510 includes a channel measuring unit 511. The channel measuring unit 511 measures intensities of interference signals of the respective communication channels. For example, the channel measuring unit 511 may measure an RSSI or LQI of a communication channel.

The channel determining unit 520 determines a communication channel available for communication with a target device based on the state information of the communication channels. The target device may be detected in a wireless power transmission region of the source device. For example, the channel determining unit 520 determines a communication channel with little interference by neighboring devices to be the communication channel available for communication with the target device. The channel determining unit 520 may determine a communication channel including an intensity of an interference signal that is less than or equal to a predetermined reference value, among the measured intensities, to be the communication channel available for communication with the target device. For example, the channel determining unit 520 may determine a communication channel with a minimum RSSI to be the communication channel available for communication with the target device.

The communication unit 540 transmits a channel seizure signal and an access standard instruction to the target device based on a communication frequency of the determined communication channel. The channel seizure signal may include a predetermined intensity. The channel seizure signal may be a continuous wave (CW) signal including the predetermined intensity and a power greater than a communication signal of a direct-sequence spread spectrum (DSSS). The channel seizure signal may be modulated based on a predetermined modulation scheme.

The access standard instruction may include information used for compatibility between the source device and the target device. The access standard instruction may include a call argument and a call parameter used to identify target devices. For example, if the same identifying parameter as a call parameter is included in the target device, the target device transmits, to the source device, a response signal.

The controller 530 determines whether to communicate with the target device using the determined communication channel based on whether a response signal corresponding to the access standard instruction is received. For example, if the response signal is received from the target device, the controller 530 determines to communicate with the target device using the determined communication channel. In response to the response signal, the controller 530 assigns a control ID to the target device.

The communication unit 540 receives, from the target device, a response signal indicating that the control ID is assigned to the target device. If the control ID is assigned to the target device, the communication unit 540 transmits a signal requesting information on a power required by the target device, using the communication frequency of the determined communication channel. The communication unit 540 receives the information on the power required by the target device from the target device.

The controller 530 determines an amount of a wireless power to be transmitted by the source device based on the information on the power required by the target device. Additionally, the controller 530 controls an amount of a power in the source device so that the source device transmits a power corresponding to the determined amount of the wireless power.

The controller 530 controls the operation of the channel search unit 510, regardless of whether the target device is waked up. For example, before the target device is detected, the controller 530 controls the channel search unit 510 to search for communication channels available for communication in the source device.

In an example in which the source device is not accessed by a target device, the controller 530 controls the operation of the channel search unit 510 based on a channel search start command. For example, if a user pushes a start button attached to the source device, the channel search start command is input.

In another example in which the source device is accessed by a target device, the controller 530 controls the operation of the channel search unit 510 based on an amount of a change in a current output from the source device. This is because the current output from the source device may be changed if another target device is added, or if the target device disappears.

If the source device is operated in the power access mode, the controller 530 determines whether the source device is accessed by the target device based on information on a power of a communication output of the source device, and information on a power of the communication output received by the target device. The power of the communication output of the source device refers to a power used to transmit data via a communication channel. If a difference between the power of the communication output of the source device and the power of the communication output received by the target, is less than a predetermined reference, the controller 530 permits the target device to access the source device. As a distance between the source device and the target device is reduced, a low amount of the power of the communication output transmitted from the source device to the target device may be lost. The source device may permit an access by a target device located near the source device first.

The controller 530 may determine a difference between a wireless power transmitted by the source device and a power transferred to a load of the target device, and may determine whether the target device incorrectly accesses the source device based on the calculated difference. If the calculated difference is greater than a predetermined reference, the controller 530 determines that the target device incorrectly accesses the source device. In other words, whether the target device incorrectly accesses the source device may be determined based on a wireless power transmission efficiency.

Additionally, the controller 530 may determine a difference between a time in which an amount of the wireless power transmitted by the source device is changed to a predetermined value, and a time in which an amount of the power transferred to the load of the target device is changed, and may determine whether the target device incorrectly accesses the source based on the calculated difference. If the calculated difference is greater than a predetermined reference, the controller 530 determines that the target device incorrectly accesses the source device.

If an interference signal including an intensity level greater than or equal to a channel selection reference level (i.e., of intensity), is measured in each of the communication channels as a result of measuring the state information of the communication channels, the channel determining unit 520 determines a communication channel with an interference signal including a lowest intensity level, among the measured intensities, to be the communication channel available for communication with the target device. Otherwise, the channel determining unit 520 determines a communication channel with an interference signal of a level less than or equal to the channel selection reference level, among the measured intensities to be the communication channel available for communication with the target device.

The controller 530 determines a power level of the communication output of the source device based on a table to which an intensity level of an interference signal in the determined communication channel, and a power level of an output signal required to transmit data within a predetermined error range, are mapped. As the intensity level of the interference signal increases, the power level of the communication output of the source device may need to increase, to transmit data within the predetermined error range.

If a value of an error in a communication channel between the source device and the target device becomes greater than a predetermined reference value, or if an intensity of an interference signal detected from the determined communication channel is greater than a predetermined value, the controller 530 determines to change the determined communication channel to another communication channel. The controller 530 determines a new communication channel using the channel determining unit 520. The controller 530 transmits, to the target device, a channel change request instruction including information on the new communication channel.

The controller 530 controls an overall operation of the communication apparatus 500, and performs functions of the channel search unit 510, the channel determining unit 520, and the communication unit 540. To individually describe functions of the channel search unit 510, the channel determining unit 520, the controller 530, and the communication unit 540, the channel search unit 510, the channel determining unit 520, the controller 530, and the communication unit 540 are separately illustrated in FIG. 5. However, if the communication apparatus 500 of FIG. 5 is implemented, the controller 530 may be configured to perform all of the functions, or only a portion of the functions.

Figure 6:
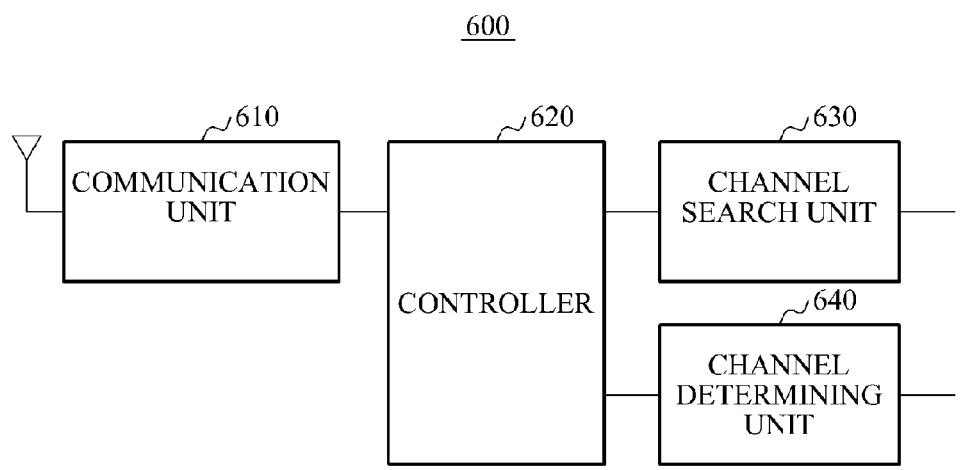
FIG. 6 is a block diagram illustrating another example of a communication apparatus in a wireless power transmission system.

FIG. 6 illustrates another example of a communication apparatus 600 in a wireless power transmission system. The communication apparatus 600 includes a communication unit 610, a controller 620, a channel search unit 630, and a channel determining unit 640. The communication apparatus 600 of FIG. 6 may correspond to a target device in the wireless power transmission system.

The channel search unit 630 searches for communication channels. The communication channels may be different from a channel used in wireless power transmission. The target device may receive a power using a wireless power transmission channel, and may transmit and receive data using a communication channel. The communication channels may be channels in an ISM band.

The channel search unit 630 selects an n-th channel, as a first target to be searched for, from among searchable channels. For example, channels may be searched for in a descending order, in an ascending order, or in a random order.

The channel search unit 630 may search for communication channels based on a search table. The search table may be set differently based on a type of a target device or a unique ID assigned to the target device. The channel search unit 630 may search for communication channels in different orders for each type of the target device, as illustrated in the example of Table 2. In an example in which the target device corresponds to a type 1, the channel search unit 630 may sequentially search for 16 channels from a channel 7. In another example in which the target device corresponds to a type 5, the channel search unit 630 may sequentially search for the 16 channels from a channel 9.

TABLE 2

Search table (16 channels, 1~16)

| Type of target, or unique ID assigned to target | | | | | | | | | | | | | | | | | |
|---|---|---|---|---|---|---|---|---|---|---|---|---|---|---|---|---|---|
| | Type1 | 7 | 8 | 9 | 10 | 11 | 12 | 13 | 14 | 15 | 16 | 1 | 2 | 3 | 4 | 5 | 6 |
| | Type2 | 2 | 3 | 4 | 5 | 6 | 7 | 8 | 9 | 10 | 11 | 12 | 13 | 14 | 15 | 16 | 1 |
| | Type3 | 10 | 11 | 12 | 13 | 14 | 15 | 16 | 1 | 2 | 3 | 4 | 5 | 6 | 7 | 8 | 9 |
| | Type4 | 3 | 4 | 5 | 6 | 7 | 8 | 9 | 10 | 11 | 12 | 13 | 14 | 15 | 16 | 1 | 2 |
| | Type5 | 9 | 10 | 11 | 12 | 13 | 14 | 15 | 16 | 1 | 2 | 3 | 4 | 5 | 6 | 7 | 8 |
| | Type6 | 1 | 2 | 3 | 4 | 5 | 6 | 7 | 8 | 9 | 10 | 11 | 12 | 13 | 14 | 15 | 16 |
| | Type7 | 16 | 1 | 2 | 3 | 4 | 5 | 6 | 7 | 8 | 9 | 10 | 11 | 12 | 13 | 14 | 15 |
| | Type8 | 12 | 13 | 14 | 15 | 16 | 1 | 2 | 3 | 4 | 5 | 6 | 7 | 8 | 9 | 10 | 11 |
| | Type9 | 6 | 7 | 8 | 9 | 10 | 11 | 12 | 13 | 14 | 15 | 16 | 1 | 2 | 3 | 4 | 5 |
| | Type10 | 11 | 12 | 13 | 14 | 15 | 16 | 1 | 2 | 3 | 4 | 5 | 6 | 7 | 8 | 9 | 10 |
| | Type11 | 4 | 5 | 6 | 7 | 8 | 9 | 10 | 11 | 12 | 13 | 14 | 15 | 16 | 1 | 2 | 3 |
| | Type12 | 15 | 16 | 1 | 2 | 3 | 4 | 5 | 6 | 7 | 8 | 9 | 10 | 11 | 12 | 13 | 14 |
| | Type13 | 5 | 6 | 7 | 8 | 9 | 10 | 11 | 12 | 13 | 14 | 15 | 16 | 1 | 2 | 3 | 4 |
| | Type14 | 8 | 9 | 10 | 11 | 12 | 13 | 14 | 15 | 16 | 1 | 2 | 3 | 4 | 5 | 6 | 7 |
| | Type15 | 13 | 14 | 15 | 16 | 1 | 2 | 3 | 4 | 5 | 6 | 7 | 8 | 9 | 10 | 11 | 12 |
| | Type16 | 14 | 15 | 16 | 1 | 2 | 3 | 4 | 5 | 6 | 7 | 8 | 9 | 10 | 11 | 12 | 13 |

The channel search unit 630 measures state information of one or more communication channels. The state information may include information on a channel seizure signal transmitted by the source device. The channel seizure signal may include a predetermined intensity. For example, the channel seizure signal may be a CW signal including a predetermined intensity and a power greater than a communication signal of a DSSS. The channel seizure signal may be modulated using a predetermined modulation scheme. The channel search unit 630 may search for a channel that enables receiving of a CW signal. The channel search unit 630 may measure an RSSI of a communication channel, and may determine whether the channel seizure signal is received based on the RSSI.

The channel determining unit 640 determines a communication channel available for communication with the source device based on the state information of the communication channels. The channel determining unit 640 may determine a channel in which a channel seizure signal including an intensity exceeding a predetermined reference value is measured, to be the communication channel available for communication with the source device. The channel seizure signal may be received from the source device, and may include a predetermined intensity. An intensity of the channel seizure signal received by the target device may be determined based on a distance between the source device and the target device. The source device and the target device may agree to communicate with each other within a predetermined distance only.

The controller 620 determines whether to communicate with the source device based on whether an access standard instruction is received from the source device within a reference time using a communication frequency of the determined communication channel. The reference time may be set in advance based on a state of a battery of the target device, and/or other factors known to one of ordinary skill in the art.

For example, if data of communication networks other than the access standard instruction is received, the controller 620 determines that the received data is different from the access standard instruction, due to different packet structures. If the access standard instruction is not received within the reference time, the controller 620 controls the channel search unit 630 to search for another communication channel.

The access standard instruction may include information used for compatibility between a source device and a target device. The access standard instruction may include a call argument and a call parameter used to identify target devices. For example, if the same identifying parameter as a call parameter is included in the target device, the target device transmits a response signal.

The communication unit 610 receives an access standard instruction from a source device. For example, if the access standard instruction is received within a reference time, the communication unit 610 transmits a response signal corresponding to the access standard instruction.

The communication unit 610 receives a control ID assigned to the target device from the source device. If the response signal corresponding to the access standard instruction is received, the source device assigns the control ID to the target device.

For example, if channel seizure signals are received from source devices, the controller 620 determines a source device that uses a communication channel with a channel seizure signal including a largest intensity, from among the source devices, to be a source device that the target device desires to access. In this example, the channel determining unit 640 determines the communication channel with the channel seizure signal including the largest intensity to be the communication channel available for communication with the source device.

The controller 620 determines a power required by the target based on a power measured at an input end of a DC/DC converter included in the target device, a power measured at an output end of the DC/DC converter, and a power transferred to a load of the target device. The communication unit 610 transmits, to the source device, information on the power measured at the input end of the DC/DC converter, and information on the power measured at the output end of the DC/DC converter. The source device may adjust a power to be transmitted to the target device so that the power measured at the input end of the DC/DC converter may include a similar value to the power measured at the output end of the DC/DC converter. The source device receives information on the power required by the target device, in real time or periodically, and accordingly, may efficiently transmit the power required by the target device to the target device.

The communication unit 610 receives a channel change request instruction from the source device. The controller 620 changes a channel used to access the source device based on communication channel information included in the channel change request instruction. The communication unit 610 may not transmit an acknowledgement (ACK) signal.

The controller 620 controls an overall operation of the communication apparatus 600, and performs functions of the communication unit 610, the channel search unit 630, and the channel determining unit 640. To individually describe functions of the communication unit 610, the controller 620, the channel search unit 630, and the channel determining unit 640, the communication unit 610, the controller 620, the channel search unit 630, and the channel determining unit 640 are separately illustrated in FIG. 6. However, if the communication apparatus 600 of FIG. 6 is implemented, the controller 620 may be configured to perform all of the functions, or only a portion of the functions.

Figure 7:
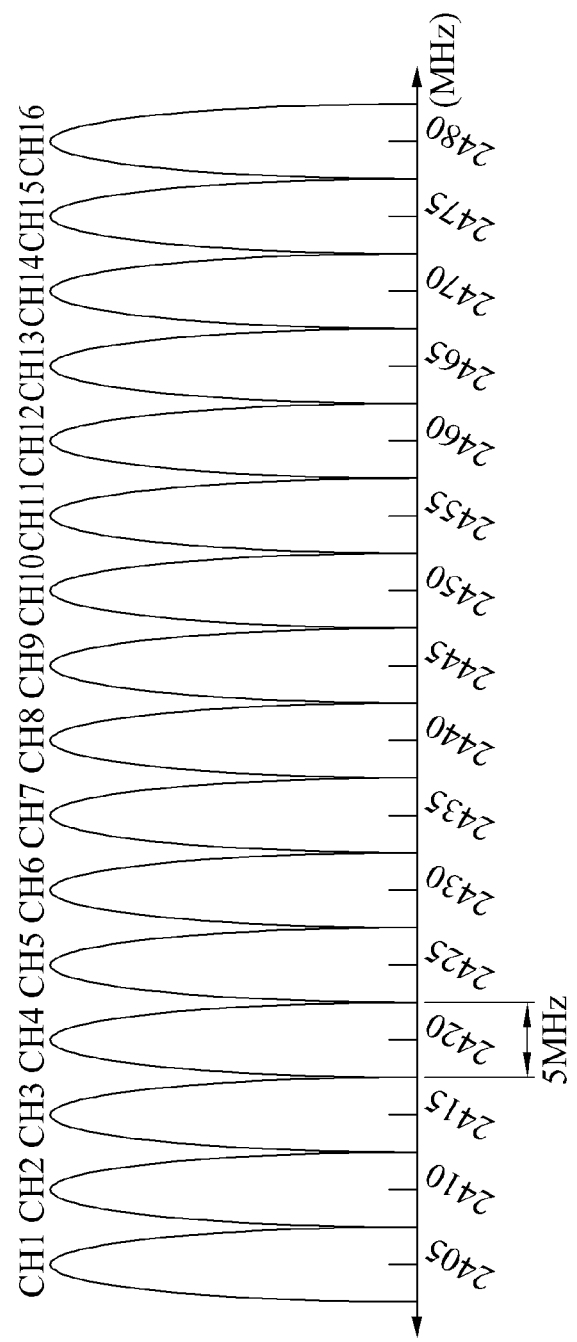
FIG. 7 is a diagram illustrating an example of communication channels that may be used in a wireless power transmission system.

FIG. 7 illustrates an example of communication channels that may be used in a wireless power transmission system. In the wireless power transmission system, a communication apparatus may use channels in an ISM band. In more detail, the communication apparatus may use, as a communication channel, a single channel among 16 channels CH1 through CH16 with a channel spacing of 5 megahertz (MHz) in a range of 2405 MHz to 2480 MHz.

Figure 8:
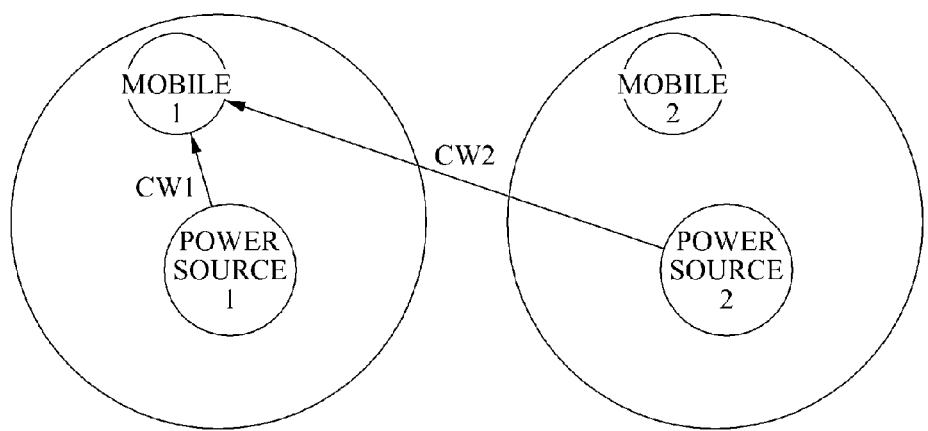
FIG. 8 is a diagram illustrating an example of a method of a target device determining a communication channel based on a continuous wave (CW) signal in a wireless power transmission system.

FIG. 8 illustrates an example of a method a target device determining a communication channel based on a CW signal in a wireless power transmission system. The wireless power transmission system includes a power source device and a mobile device. The mobile device corresponds to a target device. The power source device transmits a power, and the mobile device receives the power. To efficiently transmit the power to the mobile device, the power source device may need to be aware of information on a state of the mobile device. In other words, the power source device and the mobile device may need to communicate with each other, to exchange information on a state of the power source device and the information on the state of the mobile device with each other.

The power source device may search for communication channels in an ISM band. Additionally, the power source device may measure an RSSI for each of the communication channels, and may determine a communication channel in which an RSSI is less than a reference value, to be a communication channel available for communication with the mobile device.

To communicate with the mobile device using the determined communication channel, the power source device raises a power in the determined communication channel, and transmits a channel seizure signal in the determined communication channel. While searching for communication channels in the ISM band, the mobile device may determine the communication channel receiving the channel seizure signal, to be a communication channel available for communication with the power source device. The channel seizure signal may be, for example, a CW signal, a modulated signal, or a predetermined signal. Such a method of determining a communication channel by detecting a channel seizure signal between the power source device and the mobile device may be referred to the term "multi-channel carrier sense-seizure of channel (MCCS-CS)".

For example, if channel seizure signals are received, the mobile device may determine a communication channel with a channel seizure signal including a largest intensity among the received channel seizure signals, to be a communication channel available for communication with the power source device. The mobile device may access the power source device using the determined communication channel.

Referring to FIG. 8, a first mobile device (i.e., a mobile device 1) receives CW signals CW1 and CW2 from a first power source device (i.e., a power source device 1) and a second power source device (i.e., a power source device 2), respectively. CW signals transmitted by the same type of power source devices may include the same intensity. Accordingly, an intensity of a CW signal received by a mobile device may be determined based on a distance between the mobile device and a power source device. Since a distance between the first mobile device and the first power source device is shorter than a distance between the first mobile device and the second power source device, an intensity of the CW signal CW1 is greater than an intensity of the CW signal CW2. The first mobile device communicates with the first power source device using a communication channel receiving the CW signal CW1, and accesses the first power source device. Subsequently, the first mobile device receives a power from the first power source device.

A CW signal may be used to identify the same type of power source devices, and to identify different types of communication devices. Additionally, the CW signal may be used by a target device to identify communication channels. The CW signal may be a carrier frequency signal that is not modulated using an offset-quadrature phase-shift keying (O-QPSK), and an occurrence of the CW signal may be controlled by a frequency synthesizer.

To communicate with a target device based on a channel assignment policy, a source device may select a channel. The target device may be, for example, a charging terminal. In wireless power transmission, 16 channels may be physically supported. Each of the 16 channels may be generated with different energy intensities. When wireless power transmission is started, the source device may perform energy detection of interference signals caused by different types of devices, and on CW signals occurring from source devices of the same type as the source device. The source device may perform energy detection if all channels based on a frequency channel policy. The energy detection may be used by the source device to search for a channel to communicate with multiple target devices, in a charging environment of the multiple target devices.

The CW signal may be used to detect a channel. In addition, to detect a channel, a modulated signal or a predetermined signal may be used. To transfer information on the detected channel, the source device may increase an intensity of the CW signal in the detected channel, and may enable the target device to easily detect the channel. Accordingly, the target device may easily identify a channel available for communication based on a CW signal including a large intensity.

For example, if an unused channel is found as a result of searching, a source device may set transmission of a CW signal for stable communication between the source device and a target device. In this example, if the transmission of the CW signal is set by the source device, the target device may stably detect an RSSI or LQI, which may facilitate detection of a channel.

In a multi-charging environment, if a source device detects a channel, a value of an RSSI based on an intensity of a CW signal may be used to determine which type of device interferes with the source device. In other words, the CW signal may be used to determine whether a device that is of the same type as the source device and that transmits a wireless power, or a device that is of a different type than the source device and that does not transmit wireless power, interferes with the source device. In an example in which a device of the same type as the source device interferes with the source device, a difference in RSSI level of a CW signal may occur. In another example in which a device of a different type than the source device interferes with the source device, a difference between a DSSS and a level of the CW signal may occur.

If the same channel is shared with a device of the same type as the source device, the source device may use a CW signal to determine whether the channel is available. If a charging source device is added by using the CW signal as a channel seizure signal, a distance between the source device and the charging source device may be determined.

The target device may use a CW signal to identify an interference with a communication channel. The target device may distinguish a typical interference signal from a CW signal, and may quickly detect a communication channel. To determine a communication channel, the target device may determine whether a CW signal is received, and verify state information of a source device. The target device may attempt to access the source device, only if an access standard instruction is received.

Figure 9:
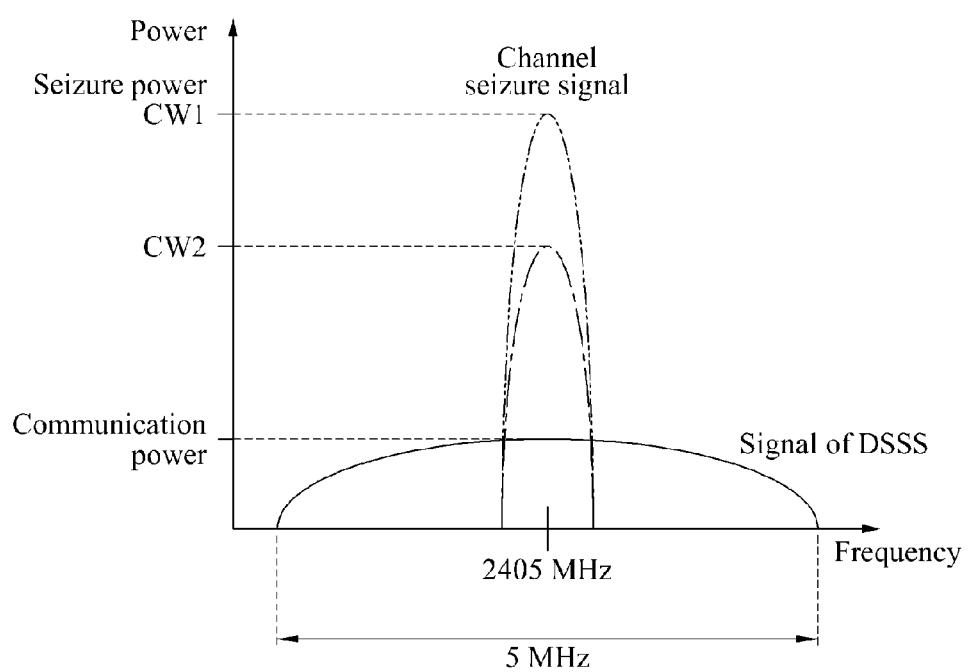
FIG. 9 is a graph illustrating examples of powers of CW signals received by a target device in a wireless power transmission system.

FIG. 9 illustrates examples of powers of CW signals received by a target device in a wireless power transmission system. In a channel with a central frequency of 2405 MHz, a communication power of an interference signal received from neighboring electronic devices corresponds to a signal of a DSSS. The signal of the DSSS includes a bandwidth of 5 MHz. The signal of the DSSS is lesser in intensity than, and is wider in bandwidth than, CW signals received from the same type of source devices.

The target device determines a channel, and a source device to communicate with the target device, based on an intensity of a channel seizure signal received via the channel. Referring to FIG. 9, the target device receives CW signals CW1 and CW2 (i.e., channel seizure signals) using the same channel. Since a power of the CW signal CW1 is greater than a power of the CW signal CW2, the target device determines to access a source device transmitting the CW signal CW1, and determines the channel with the central frequency of 2405 MHz to be a communication channel.

Figure 10:
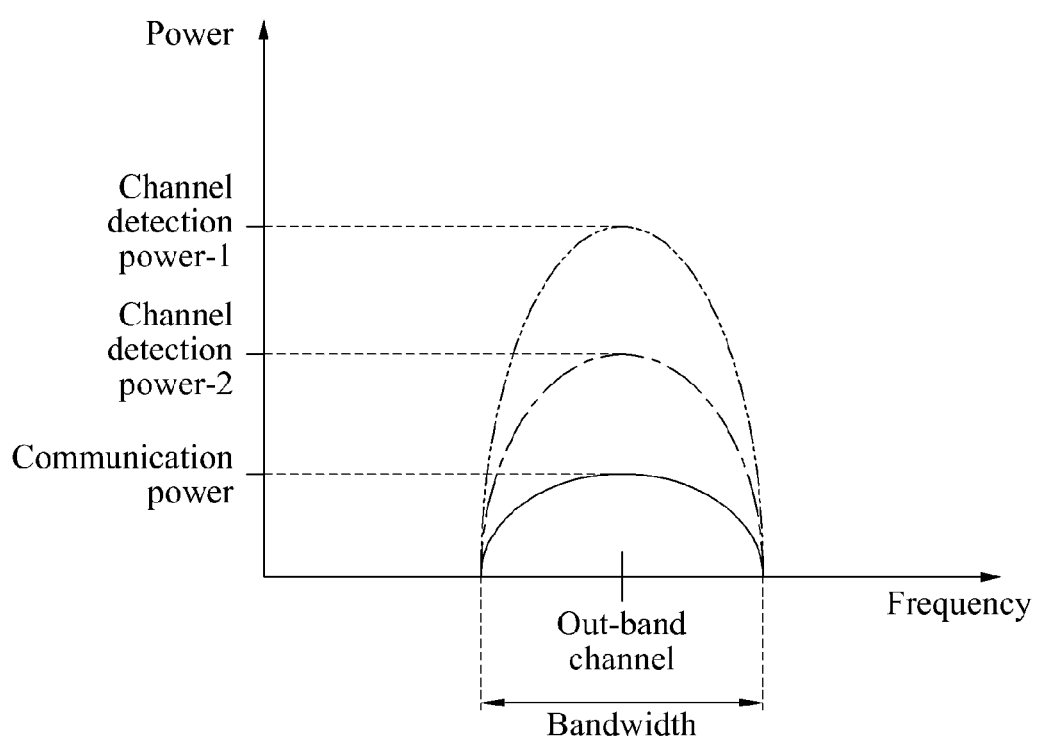
FIG. 10 is a graph illustrating examples of powers of communication channel signals received by a target device in a wireless power transmission system.

FIG. 10 illustrates examples of powers of communication channel signals received by a target device in a wireless power transmission system. Source devices transmit channel seizure signals using the same communication scheme as neighboring electronic devices (i.e., the same out-band channel and same bandwidth), unlike in FIG. 9. However, the source devices increases a power of the channel seizure signals, compared to a communication power of an interference signal received from the neighboring electronic devices, and transmits the channel seizure signals with the increased power.

For example, the target device receives a first channel seizure signal and a second channel seizure signal of a channel detection power 1 and a channel detection power 2, respectively. The target device compares the channel detection power 1 with the channel detection power 2. Since the channel detection power 1 is greater than the channel detection power 2, the target device accesses a source device transmitting the first channel seizure signal. Additionally, to communicate with the source device transmitting the first channel seizure signal, the target device determines the out-band channel to be a communication channel.

Figure 11:
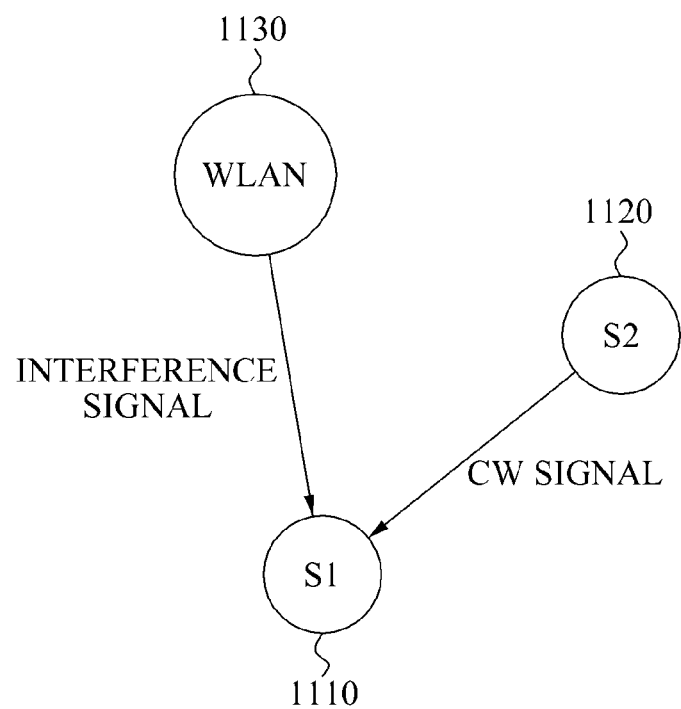
FIG. 11 is a diagram illustrating an example of an interference signal influencing a source device in a wireless power transmission system.

FIG. 11 illustrates an example of an interference signal influencing a source device in a wireless power transmission system. In more detail, a source device S1 1110 searches for a communication channel. If the communication channel is found, the source device S1 1110 receives an interference signal from a WLAN 1130. The WLAN 1130 may be of a different type from the source device S1 1110, and may not transmit wireless power. Additionally, the source device S1 1110 receives a CW signal from a source device S2 1120. The source device S2 1120 is of the same type as the source device S1 1110, and transmits a wireless power. The source device S1 1110 measures an intensity (e.g., an RSSI) of the interference signal and an intensity (e.g., an RSSI) of the CW signal, for each communication channel. If one of the intensities is less than or equal to a predetermined value, the source device S1 1110 determines a corresponding channel to be a communication channel.

Figure 12:
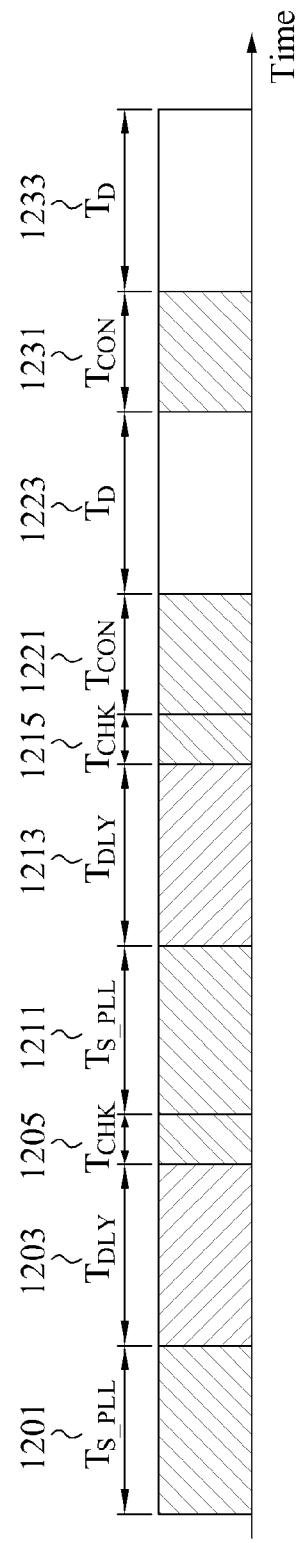
FIG. 12 is a graph illustrating an example of a timing in which a source device determines a communication channel in a wireless power transmission system.

FIG. 12 illustrates an example of a timing in which a source device determines a communication channel in a wireless power transmission system. The source device searches for communication channels, and detects an RSSI for each of the communication channels.

In a time $T_{S\_PLL}$ 1201, the source device adjusts a channel frequency to be a frequency of a channel to be searched for. In a time $T_{DLY}$ 1203, the source device stabilizes the adjusted channel frequency. In a time $T_{CHK}$ 1205, the source device detects an RSSI of the channel. If a level of the RSSI of the channel is greater than a reference value, the source device determines that the channel is being used, and searches for a next channel, as shown herein.

In a time $T_{S\_PLL}$ 1211, the source device adjusts a channel frequency to be a frequency of the next channel. In a time $T_{DLY}$ 1213, the source device stabilizes the adjusted channel frequency. In a time $T_{CHK}$ 1215, the source device detects an RSSI of the next channel. If a level of the RSSI of the next channel is less than or equal to the reference value, the source device determines the next channel to be a communication channel for communication with a corresponding target device, as shown herein. The time $T_{CHK}$ 1215 may be set differently based on a type of the source device, or a type of a target device accessing the source device.

In a time $T_{CON}$ 1221, the source device transmits an access standard instruction. In a time $T_D$ 1223, the source device waits for reception of a response signal corresponding to the access standard instruction. The access standard instruction may include information used to connect the source device and the target device. Additionally, the access standard instruction may include an instruction to request state information of the target device. In a time $T_{CON}$ 1231, the source device transmits a new access standard instruction. In a time $T_D$ 1233, the source device waits for reception of a response signal corresponding to the new access standard instruction.

Figure 13:
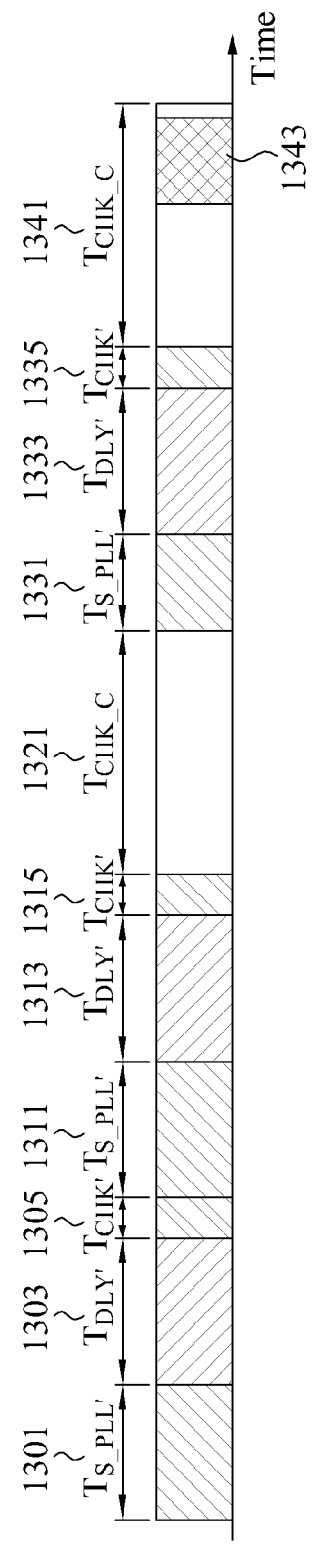
FIG. 13 is a graph illustrating an example of a timing in which a target device determines a communication channel in a wireless power transmission system.

FIG. 13 illustrates an example of a timing in which a target device determines a communication channel in a wireless power transmission system. The target device searches for communication channels, and detects an RSSI for each of the communication channels.

In a time $T_{S\_PLL'}$ 1301, the target device adjusts a channel frequency to be a frequency of a channel to be searched for. In a time $T_{DLY'}$ 1303, the target device stabilizes the adjusted channel frequency. In a time $T_{CHK'}$ 1305, the target device detects an RSSI of the channel to determine whether a channel seizure signal is received via the channel. If the level of the RSSI is less than a reference value, the target device determines that the source device does not transmit a channel seizure signal, and searches for a next channel, as shown herein.

In a time $T_{S\_PLL'}$ 1311, the target device adjusts a channel frequency to be a frequency of the next channel. In a time $T_{DLY'}$ 1313, the target device stabilizes the adjusted channel frequency. In a time $T_{CHK'}$ 1315, the target device detects an RSSI of the next channel. If a level of the RSSI of the next channel is greater than or equal to the reference value, the target device determines the next channel to be a communication channel for communication with a corresponding source device, as shown herein. The time $T_{CHK'}$ 1315 may be set differently based on a type of the target device, or a type of the source device accessed by the target device.

In a time $T_{CHK\_C}$ 1321, the target device waits for reception of an access standard instruction from the source device. If the access standard instruction is not received in the time $T_{CHK\_C}$ 1321, as shown herein, in a time $T_{S\_PLL'}$ 1331, the target device again adjusts a channel frequency to be a frequency of a next channel. In a time $T_{DLY'}$ 1333, the target device stabilizes the adjusted channel frequency. In a time $T_{CHK'}$ 1335, the target device detects an RSSI of the next channel. If a level of the RSSI of the next channel is greater than or equal to the reference value, the target device determines the next channel to be a communication channel for communication with a corresponding new source device, as shown herein.

In a time $T_{CHK\_C}$ 1341, the target device waits for reception of a new access standard instruction from the new source device. If the new access standard instruction is received in the time $T_{CHK\_C}$ 1341, as shown herein, in a time 1343, the target device transmits an ACK signal to the new source device.

Figure 14:
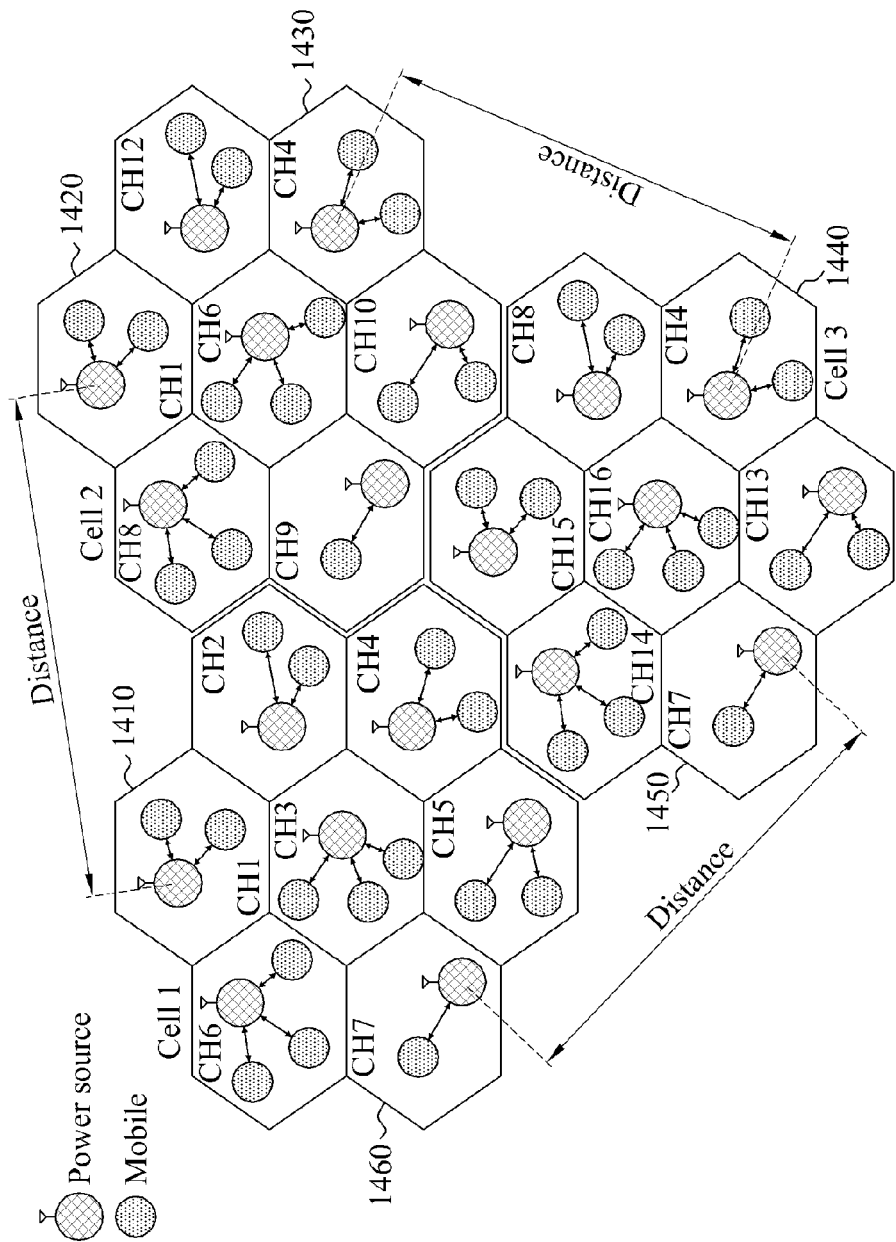
FIG. 14 is a diagram illustrating an example of wireless power transmission systems placed in a cell unit.

FIG. 14 illustrates an example of wireless power transmission systems placed in a cell unit. Each of the wireless power transmission systems includes a power source device and at least one mobile device. The mobile device corresponds to a target device.

The wireless power transmission systems are managed in the cell unit. A cell includes regions in which channels may be used. A relationship between cells of FIG. 14 and channels may be defined, as illustrated in the example of Table 3.

TABLE 3

|  | Available channel | Interference channel | Shared channel |
| --- | --- | --- | --- |
| Cell 1 | Ch1, Ch2, Ch3, Ch4, Ch5, Ch6, Ch7 | Ch8, Ch9, Ch10, Ch11, Ch12, Ch13, Ch14, Ch15, Ch16 | Cell 2 - Ch1, Ch4 Cell 3 - Ch4, Ch7 |
| Cell 2 | Ch1, Ch4, Ch8, Ch9, Ch10, Ch11, Ch12 | Ch2, Ch3, Ch5, Ch6, Ch7, Ch13, Ch14, Ch15, Ch16 | Cell 1 - Ch1, Ch4 Cell 3 - Ch4, Ch8 |
| Cell 3 | Ch4, Ch7, Ch8, Ch13, Ch14, Ch15, Ch16 | Ch1, Ch2, Ch3, Ch5, Ch6, Ch9, Ch10, Ch11, Ch12 | Cell 1 - Ch4, Ch7 Cell 2 - Ch4, Ch8 |

In Table 3, an available channel refers to a channel that may be used to perform communication in a wireless power transmission system. Additionally, an interference channel refers to a channel that may not be used due to interference of signals generated from networks, such as, for example a WLAN 802.11, a WPAN 802.15, and a WMAN 802.16. A shared channel refers to a channel that may be shared since a distance between regions in different cells is greater than a predetermined reference. In the shared channel, an interference signal may include a low level, and interference may be less likely to occur between different cells. Whether a channel in a cell is available in another cell may be determined based on whether a value of an LQI or a value of an RSSI is less than or equal to a reference value. For example, referring to FIG. 14, wireless power transmission systems in the region 1410 and region 1420, respectively, share a channel CH1, wireless power transmission systems in the region 1430 and region 1440, respectively, share a channel CH4, and wireless power transmission systems in the region 1450 and region 1460, respectively, share a channel CH7.

Referring to Table 3 and FIG. 14, a cell 1 and a cell 2 share channels CH1 and CH4, and the cell 1 and a cell 3 share channels CH4 and CH7. Additionally, the cell 2 and the cell 3 share channels CH4 and CH8.

For example, when source devices of the same type are used in a short distance, a target device required to be charged may access a source device other than a desired source device that the target device needs to access. To prevent the target device from accessing a source device other than the desired source device, a basic processing scheme, a processing scheme in an access mode, a processing scheme in a charging mode, and a processing scheme of preventing an error in access, may be provided.

In a basic processing scheme, to prevent the target device from incorrectly accessing a source device other than the desired source device, among the source devices of the same type, the desired source device may be operated in a master mode. The desired source device in the master mode may process an access by the target device, regardless of whether the target device is waked up.

In an example in which no target device accesses a source device, the source device may start processing an access of a target device using only a start button. Only the source device, of which the start button is pushed, among the source devices, may process the access, and accordingly, a possibility for the target device to incorrectly access another source device may be reduced. Additionally, it is possible to reduce waste of unnecessary power in a standby mode. In another example in which a target device accesses a source device, if a supplied current is changed in the source device, the source device may process the access by the target device.

In a processing scheme in an access mode, if an access standard instruction is transmitted from a source device to a target device, or if a source device transmits an access standard instruction using a communication channel, information on used power may be included in the access standard instruction, and may be transferred to the target device. The target device may transfer the received information, and information on a power to be transmitted, to the source device, and accordingly, it is possible to prevent the target device from incorrectly accessing the source device.

In more detail, the source device may transmit, to the target device, an access standard instruction including a communication output of a control channel, namely, a communication channel. The target device may transmit, to the source device, a response signal including a value of an LQI or a value of an RSSI of a packet received from the source device, and including a communication output of a current control channel.

Based on the information acquired by the above methods, the source device may verify the LQI or RSSI of the packet received by the target device, the communication output transmitted by the target device, and an LQI or RSSI of a packet transmitted by the target device, compared to the communication output of the source device. The source device may calculate a distance between the source device and the target device based on the verified information. Exchanging of the information on the communication output of the source device and information on the communication output of the target device with each other, may be required to prepare for adjustment of an output of a control channel based on a usage environment, and of an applied product, and may be required to prepare for a case in which the source device and the target device independently determine an incorrect access.

In a processing scheme in a charging mode, if target devices are being charged by source devices A and B in a short distance, and if a new target device approaches the source devices A and B, which one of the source devices A and B to be accessed by the new target device, may need to be determined. In this example, a target device may incorrectly access a source device since at least two source devices of the same type are located close enough to the target device. The source device A may be incorrectly accessed by the target device, and the source device B may need to be accessed by the target device. Additionally, a target device C may be required to be charged.

The source device A may raise a power, and transmit a higher power to the target device C; however, a relatively low power may be transferred to the target device C, compared to a normal access. The source device A may regularly receive, from the target device C, a power of an input end of the target device C, a power of an output end of the target device C, and state information of the target device C. The source device A may determine that the target device C incorrectly accesses the source device A based on the received power of the input end of the target device C, the received power of the output end of the target device C, and the received state information of the target device C.

The source device A may transmit a target reset instruction to the target device C, and may cancel registration of a control ID assigned to the target device C. Additionally, the source device A may enable a light-emitting diode (LED) indicator indicating a charging mode to flicker for five seconds.

In response to the target reset instruction, the target device C may be initialized, and may be automatically disconnected from the source device A. Subsequently, the target device C may determine whether to access the source device B based on a state of the source device B.

If no target device accesses the source device B, and if the target device C is initialized before a maximum access time elapses, the target device C may directly access the source device B. For example, the maximum access time may be from about 5 seconds to 10 seconds. The maximum access time may be adjusted based on user conveniences. If the target device C is initialized after the maximum access time elapses, a user may re-push a charging start button of a source device.

If a target device accesses the source device B, a current supplied in the source device B may be changed due to an access by the target device C. Accordingly, the source device B may detect a change in the supplied current, and may process the access.

In a processing scheme of preventing error in access, a source device may adjust an output level of a CW signal to a target device, and may reduce a communication distance. The source device may detect the output level of the CW signal, and may verify the communication distance, based on an RSSI table written for each distance from the source device.

A target device may re-adjust a transmission mode, namely, a time in which a response signal or other signals are transmitted. The target device may further reduce a time required to connect a channel and to perform communication between a source device and the target device.

A source device may display an access attempt event (i.e., a flag), and may use the access attempt event to indicate a source device that is attempting to access. The source device may insert, in a transmitted packet, state indication information indicating that an attempt to access is being performed.

If it is difficult to perform communication due to an interference occurring in a communication channel between a source device and a target device, the source device may transmit a channel change request instruction, and may change the communication channel. Whether an interference of a channel occurs, and a level of an interference, may be determined based on a packet error and a communication error packet counter.

If a source device performs communication in a dense space, a communication reception sensitivity may be reduced. The source device may increase a communication output level in only a communication interval.

A source device may cancel a general instruction if an access standard instruction is transmitted to a target device. A source device may prevent a target device from being operated in an access mode, in a maximum access state.

Figure 15:
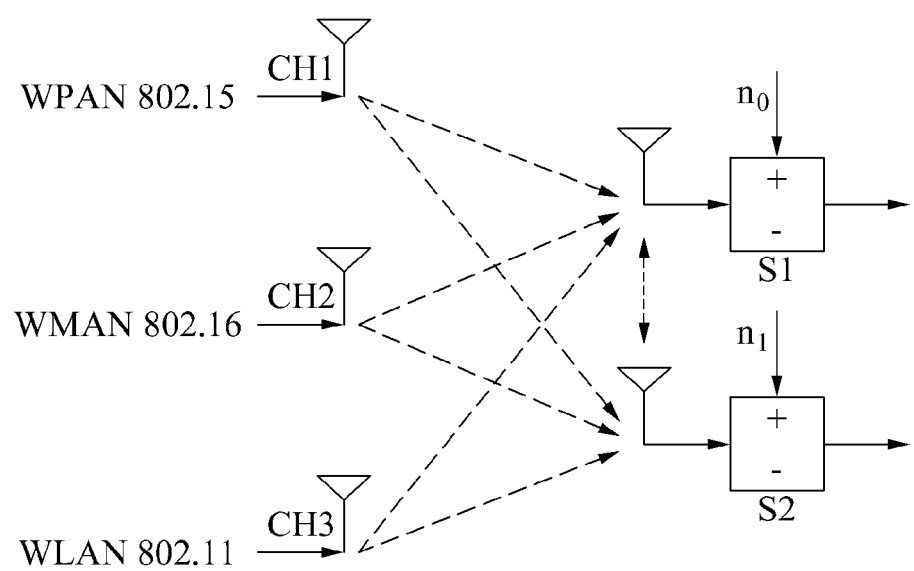
FIG. 15 is a diagram illustrating an example of communication networks influencing communication channels of source devices in a wireless power transmission system.

FIG. 15 illustrates an example of communication networks influencing communication channels of source devices in a wireless power transmission system. When source devices S1 and S2 search for communication channels, a WPAN 802.15 may interfere with the source devices S1 and S2 in a channel CH1, a WMAN 802.16 may interfere with the source devices S1 and S2 in a channel CH2, and a WLAN 802.11 may interfere with the source devices S1 and S2 in a channel CH3. In an example in which three communication channels, namely, the channels CH1 to CH3, are available to the source devices S1 and S2, a reference to determine a communication channel may be required. The source devices S1 and S2 may wait until the interference is reduced, and may then determine a communication channel. Other channel determination references will be described with reference to FIG. 16.

Figure 16:
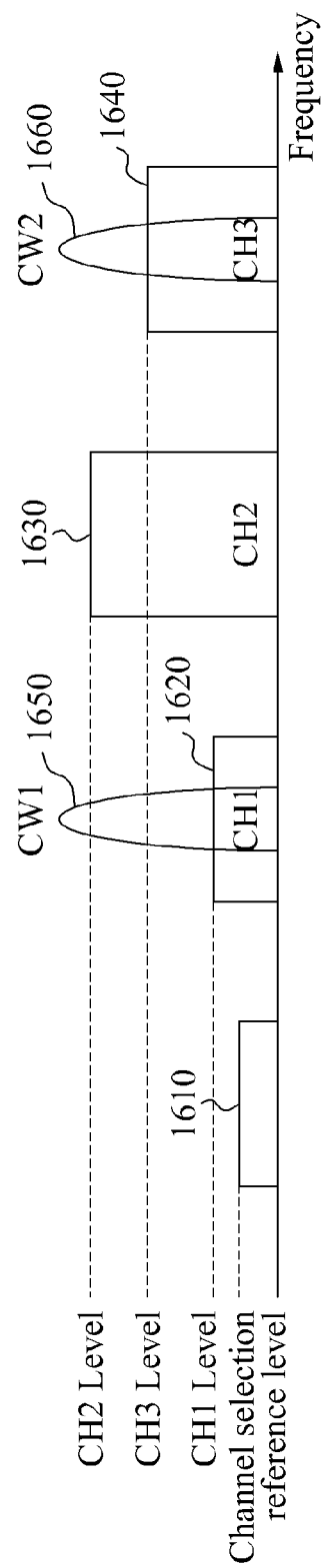
FIG. 16 is a graph illustrating an example of intensities of signals detected from communication channels in a wireless power transmission system.

FIG. 16 illustrates an example of intensities of signals detected from communication channels in a wireless power transmission system. Interference signals include intensity levels 1620, 1630, and 1640, respectively, which are higher than a channel selection reference level 1610. The levels 1620, 1630, and 1640 are detected from channels CH1, CH2, and CH3, respectively. A WPAN 802.15, a WMAN 802.16, and a WLAN 802.11 may interfere with the channels CH1, CH2, and CH3. A first source device may select, as a communication channel, the channel CH1 with the interference signal including a lowest intensity level among the channels CH1, CH2, and CH3, and may transmit a CW signal CW1 1650 to a target device. Subsequently, a second source device may select, as a communication channel, the channel CH2 with the interference signal including a lower intensity level among the channels CH2 and CH3, and may transmit a CW signal CW2 1660 to the target device.

Figure 17:
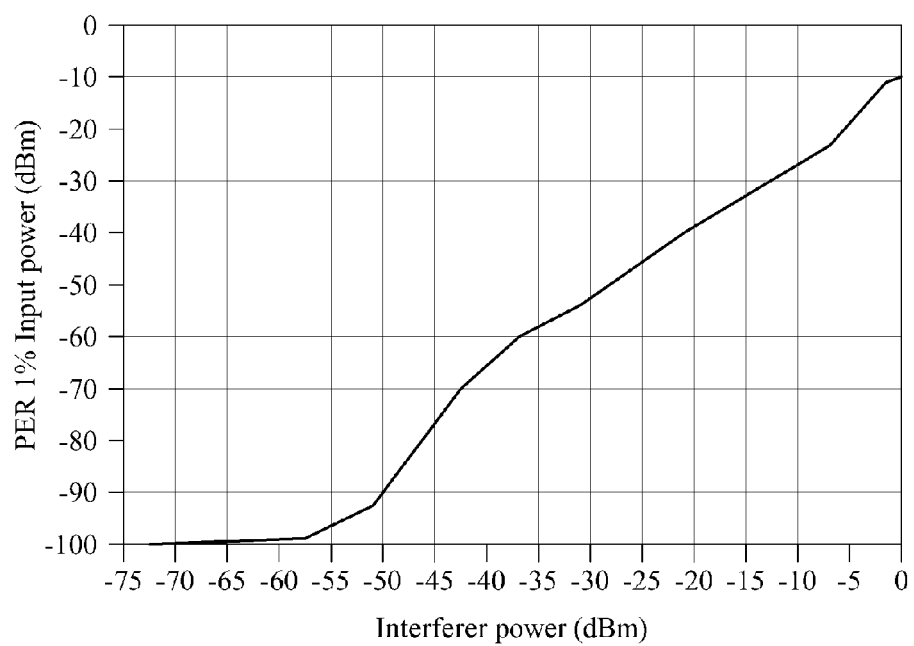
FIG. 17 is a graph illustrating an example of a relationship between a power of a signal interfering with a communication channel of a source device, and an input power in the communication channel, in a wireless power transmission system.

FIG. 17 illustrates an example of a relationship between a power of a signal interfering with a communication channel of a source device, and an input power in the communication channel, in a wireless power transmission system. For example, if the source device selects a communication channel from among communication channels in which levels of interference signals are higher than a channel selection reference level, an input power of the selected communication channel may need to be increased based on a power level of an interference signal of the selected communication channel, to reduce a data transmission error rate. Referring to FIG. 17, when an output of an interference signal (namely, an interferer power) is increased, a power input into a communication channel may also need to be increased, to reduce a data transmission error rate to less than 1%.

Figure 18:
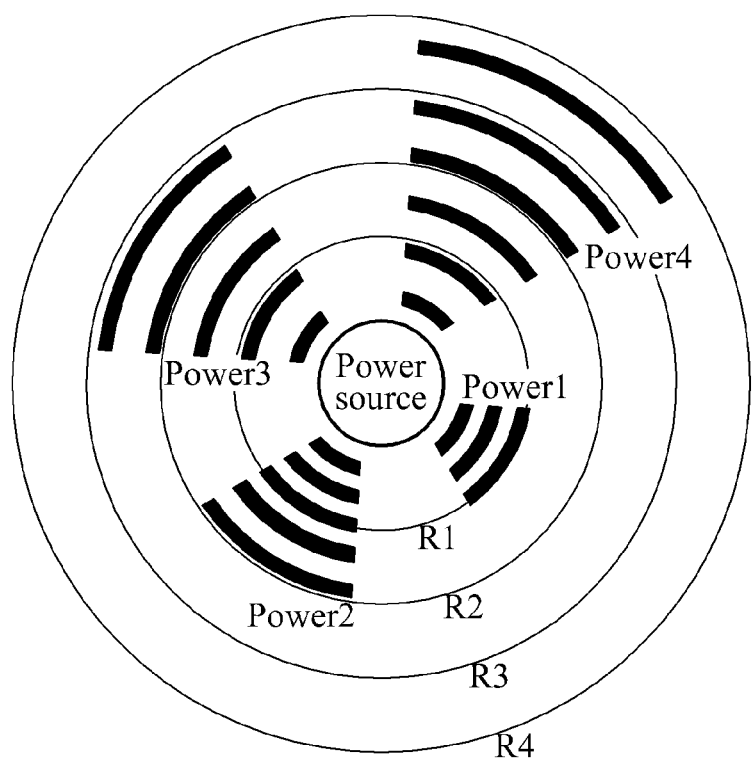
FIG. 18 is a diagram illustrating an example of a communication distance based on an adjustment of a power output from a power source device in a wireless power transmission system.

FIG. 18 illustrates an example of a communication distance based on an adjustment of a power output from a power source device in a wireless power transmission system. That is, the power source device adjusts a distance enabling communication, by adjusting an output power level of a communication channel. The power source device adjusts the distance to be suitable for a charging pad. For example, if the output power level of the power source device corresponds to a power 1, communication may be performed in a region with a radius R1. In this example, the power source device may adjust the output power level from the power 1 to a power 3, which changes the region with the radius R1 to a region with a radius R3, so that the communication may be performed in the region with the radius R3.

For example, the power source device may be implemented in the form of a pad. In this example, an antenna with a radiation pattern, and/or a chip antenna, may be used. A target device may use, for example, a flexible printed circuit board (FPCB) type antenna, for directivity and near field communication.

Figure 19:
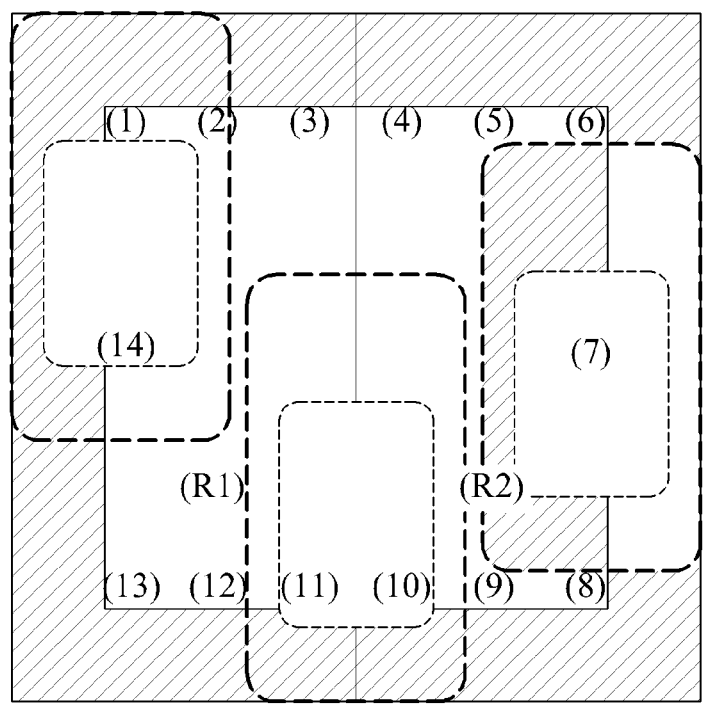
FIG. 19 is a diagram illustrating an example of a position of a target device in a wireless power transmission system.

FIG. 19 illustrates an example of a position of a target device in a wireless power transmission system. In the wireless power transmission system, a source device may include a source resonator, and a target device may include a target resonator. A power transferred to the target resonator among a power transmitted via the source resonator, namely, a wireless power transmission efficiency, may be measured based on a position of the target resonator located above the source resonator, as illustrated in the example of FIG. 19 and Table 4. FIG. 19 and Table 4 shows that the wireless power transmission efficiency varies based on the position of the target resonator. For example, in positions (3) and (4), a relatively low wireless power transmission efficiency is measured.

TABLE 4

| Position | Efficiency (%) | Position | Efficiency (%) |
| --- | --- | --- | --- |
| (1) | 88.33 | (8) | 87.02 |
| (2) | 88.84 | (9) | 91.07 |
| (3) | 78.25 | (10) | 84.65 |
| (4) | 79.79 | (11) | 83.68 |
| (5) | 90.47 | (12) | 91.22 |
| (6) | 85.99 | (13) | 86.83 |
| (7) | 88.47 | (14) | 91.23 |
| (R1) | 88.17 | (R2) | 88.73 |

Figure 20:
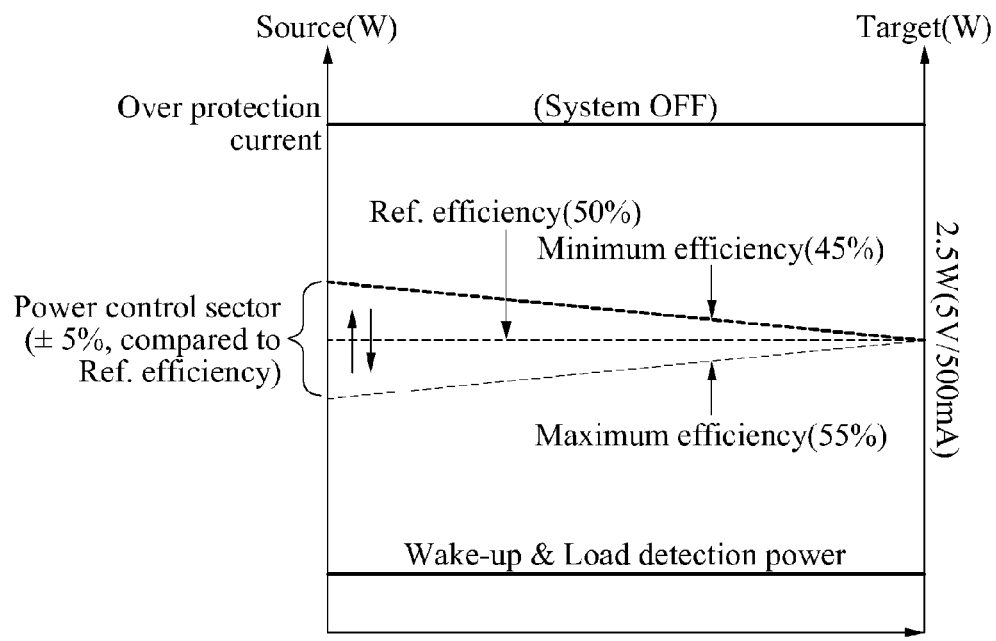
FIG. 20 is a graph illustrating an example of a power transmission efficiency based on a position of a target device in a wireless power transmission system.

FIG. 20 illustrates an example of a power transmission efficiency based on a position of a target device in a wireless power transmission system. In the wireless power transmission system, a source device may include a source resonator, and the target device may include a target resonator.

Referring to FIG. 20, the source device may adjust an amount of a power transmitted via the source resonator, so that a power transferred to the target resonator among the power transmitted via the source resonator may be maintained, regardless of a position of the target resonator located above the source resonator. In an example in which a power value detected in the source device is greater than or equal to a power value of an over protection current, the wireless power transmission system is turned off. In another example in which a reference efficiency of a wireless power transmission efficiency is 50%, the source device controls the transmitted power to be within a range of ±5% compared to the reference efficiency (i.e., a power control sector), regardless of the position of the target resonator.

To control the power, a power tracking scheme may be used. The power tracking scheme may be used to control a supplied voltage based on an output power level so that an E-class power amplifier may be operated in a saturation region. A scheme of controlling the supplied voltage may include a scheme of using an external SMPS, and/or a scheme of using a commercialized SMPS, and may be applied based on a used application.

Figure 21:
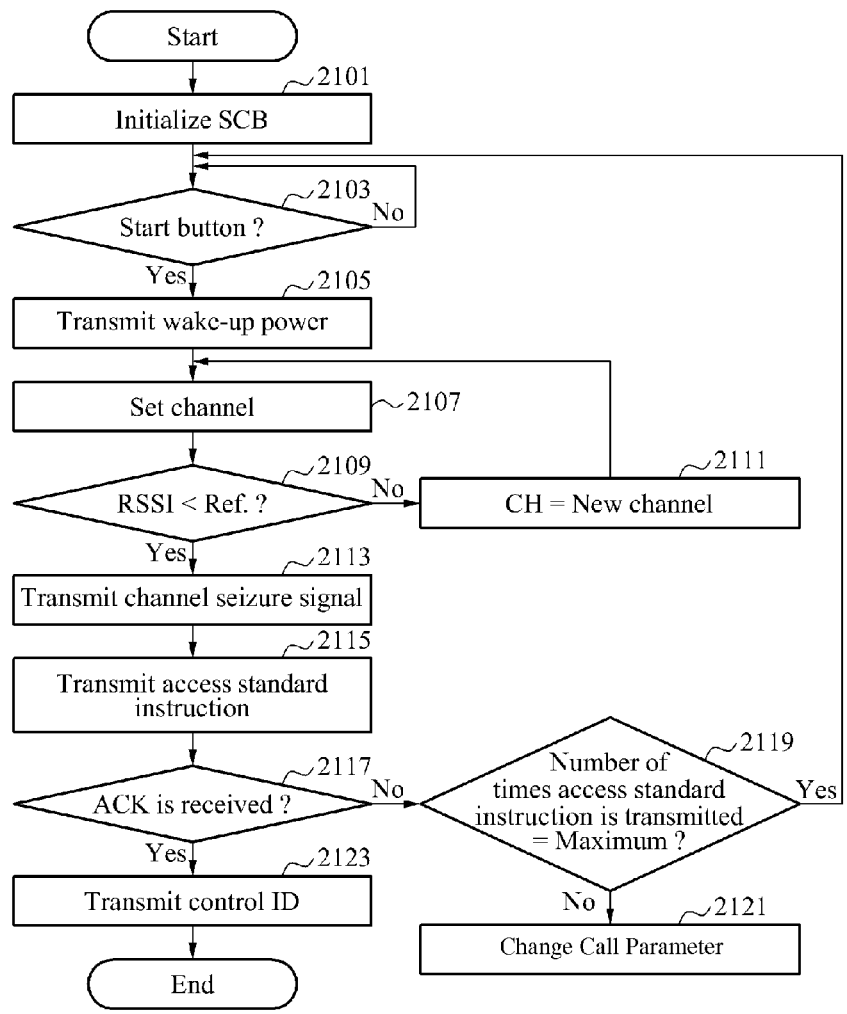
FIG. 21 is a flowchart illustrating an example of a communication method in a wireless power transmission system.

FIG. 21 illustrates an example of a communication method in a wireless power transmission system. In operation 2101, a source device initializes an SCB. The source may initialize updated system information in the SCB to system information set at a time of manufacturing the source device. The system information may include, for example, a serial number of the source device, a maximum number of target devices accessible to the source device, a power transmission parameter, a communication channel parameter, and/or other information known to one of ordinary skill in the art.

In operation 2103, the source device determines whether a start button is input in the source device. The source device prepares for transmission of wireless power based on the input of the start button. The input of the start button may indicate that a target device is located in a wireless power transmission region of the source device.

If the start button is input, in operation 2105, the source device transmits a wake-up power required to operate a controller of the target device. Otherwise, the source device returns to operation 2103.

In operation 2107, the source device searches for communication channels in a search order. The source device sets one of the communication channels to potentially be a communication channel available for communication with the target device.

In operation 2109, the source device detects an RSSI of the set communication channel, and determines whether the detected RSSI is less than a reference value. The RSSI indicates an intensity of an interference signal in the communication channel affected by neighboring communication devices.

If the detected RSSI is greater than or equal to the reference value, in operation 2111, the source device searches for a new channel and returns to the operation 2107. Otherwise, in operation 2113, the source device determines the set communication channel to be the communication channel available for communication with the target device, transmits a channel seizure signal based on a communication frequency of the set communication channel. The channel seizure signal may be a CW signal. The source device may continue to transmit the channel seizure signal while the set communication channel is used.

In operation 2115, the source device transmits an access standard instruction. The access standard instruction may include information used for compatibility between the source device and the target device. The access standard instruction may further include a call argument and a call parameter used to identify target devices. For example, if the same identifying parameter as the call parameter is included in the target device, the target device transmits a response signal to the source device.

In operation 2117, the source device determines whether the response signal (e.g., an ACK signal) is received from the target. If the ACK is not received, in operation 2119, the source device determines whether the access standard instruction is transmitted a maximum number of times. For example, if the call argument in the access standard instruction is set to "3", the call parameter may include a value from "000" to "111". In this example, the source device may transmit the access standard instruction eight times.

If the access standard instruction is not transmitted the maximum number of times, in operation 2121, the source device changes the call parameter, e.g., increments the value of the call parameter. Otherwise, the source device returns to operation 2103.

If the ACK is received, in operation 2123, the source device assigns a control ID to the target device. The source device transmits the control ID to the target device.

Figure 22:
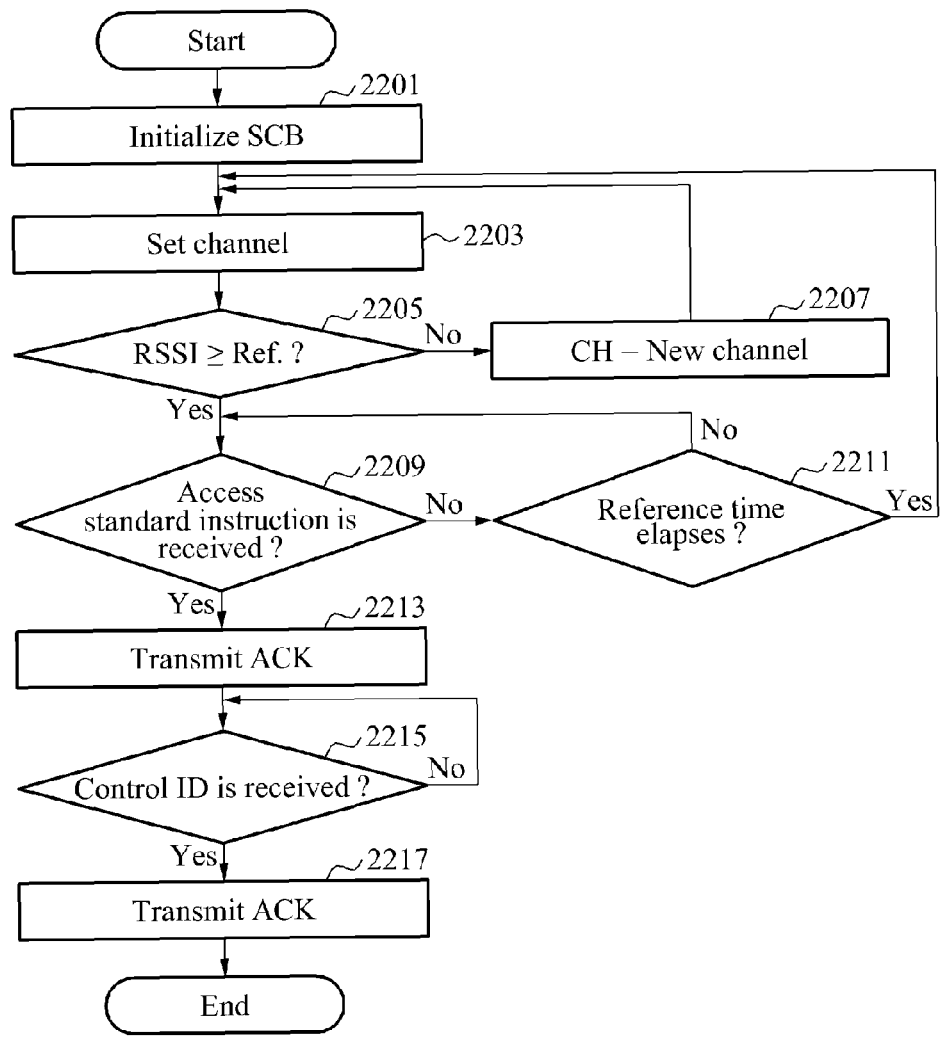
FIG. 22 is a flowchart illustrating another example of a communication method in a wireless power transmission system.

FIG. 22 illustrates another example of a communication method in a wireless power transmission system. In operation 2201, a target device initializes an SCB. The target may initialize updated system information in the SCB to system information used at a time of manufacturing the target device. The system information may include, for example, a serial number of the target device, a battery type, a power transmission parameter, a communication channel parameter, and/or other information known to one of ordinary skill in the art.

In operation 2203, the target device searches for communication channels in a search order. The target device sets one of communication channels to potentially be a communication channel available for communication with a source device.

In operation 2205, the target device detects an RSSI of the set communication channel, and determines whether the detected RSSI is greater than or equal to a reference value. The RSSI indicates an intensity of a channel seizure signal received from the source device. For example, the RSSI may indicate an intensity of a CW signal.

If the detected RSSI is less than the reference value, in operation 2207, the target device searches for a new channel and returns to operation 2203. Otherwise, in operation 2209, the target device determines the set communication channel to be the communication channel available for communication with the source device. The target device determines whether an access standard instruction is received from the source device. The access standard instruction may include information used for compatibility between the source device and the target device. The access standard instruction may further include a call argument and a call parameter used to identify target devices. For example, if the same identifying parameter as a call parameter is included in the target device, the target device transmits a response signal to the source device.

If the access standard instruction is not received, in operation 2211, the target device determines whether a reference time elapses. If the reference time does not elapse, the target device returns to operation 2209 to wait for reception of the access standard instruction until the reference time elapses. If the reference time elapses, the target device returns to operation 2203 to set another one of the communication channels in the search order.

If the access standard instruction is received, in operation 2213, the target device transmits the response signal (e.g., an ACK signal) to the source device. In operation 2215, the target device determines whether a control ID is received from the source device.

If the control ID is received, in operation 2217, the target device transmits an ACK signal to the source device. Otherwise, the target device returns to operation 2215 to wait for reception of the control ID When the source device assigns the control ID to the target device, the source device may call the control ID, and may request state information of the target device.

Figure 23:
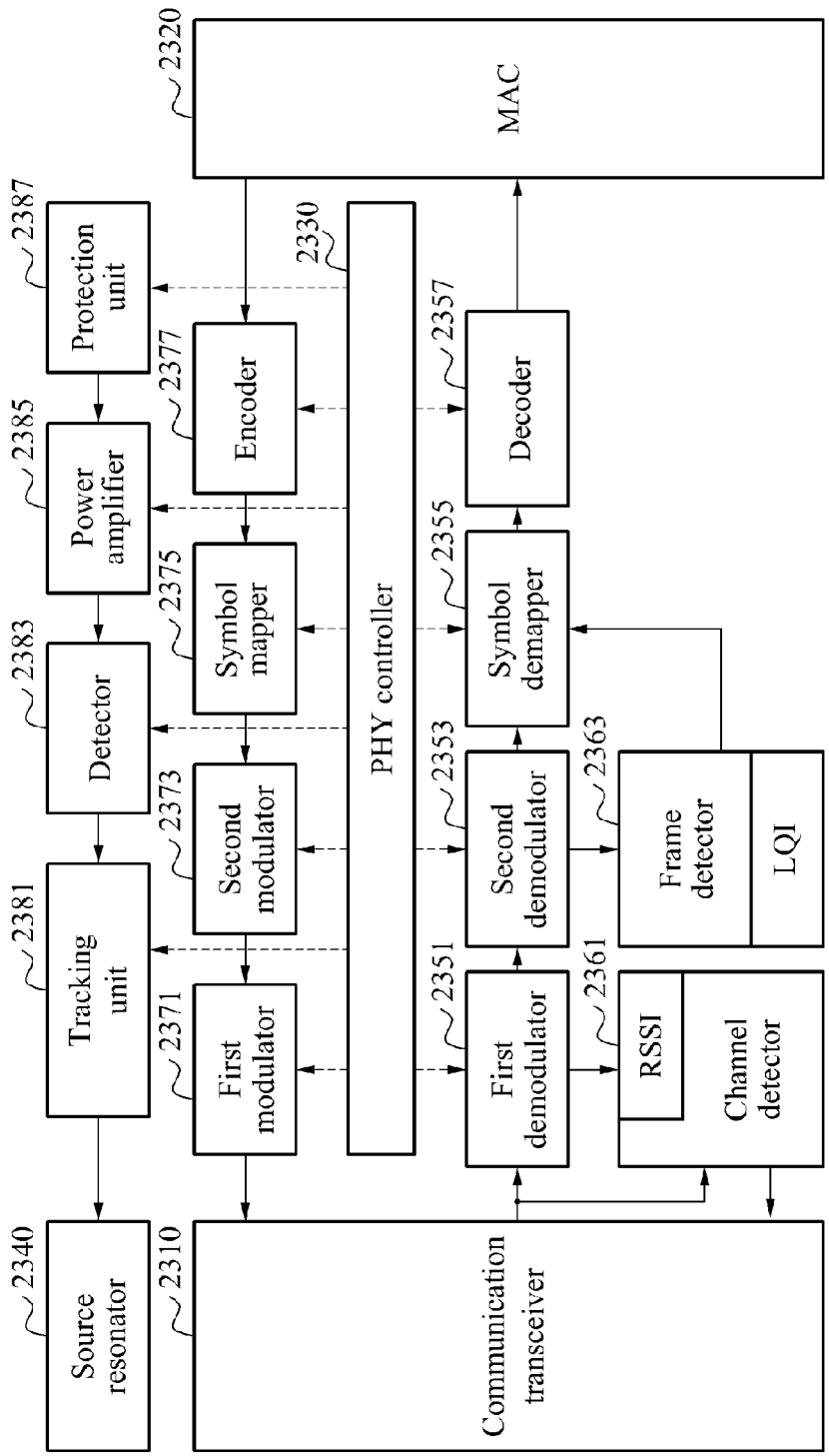
FIG. 23 is a block diagram illustrating still another example of a communication apparatus in a wireless power transmission system.

FIG. 23 illustrates still another example of a communication apparatus in a wireless power transmission system. Referring to FIG. 23, the communication apparatus transmits a signal modulated in a source via a communication transceiver 2310 and a medium access control (MAC) 2320, and receives a signal modulated in a target via the communication transceiver 2310 and the medium access control (MAC) 2320. Thus, the communication apparatus in FIG. 23 performs out-of-band communication between the source and the target via the communication transceiver 2310, rather than performing in-band communication through the source resonator 2340. A PHY controller 2330 controls an overall operation associated with modulation of data and generation of wireless power in the communication apparatus. A source resonator 2340, for example a wireless power transmitter, transmits wireless power using mutual resonance with a target resonator (not shown).

A first demodulator 2351, for example an offset-quadrature phase-shift keying (O-QPSK) demodulator, performs O-QPSK demodulation. A second demodulator 2353, for example a chip demodulator, performs demodulation using a pseudo-random noise (PN) sequence. A symbol demapper 2355 generates a data symbol corresponding to a quadraturephase (Q) value and an in-phase (I) value. A decoder 2357, for example a Viterbi decoder, decodes the data symbol using a Viterbi scheme. The decoder 2357 uses a Viterbi algorithm to decode an encoded bit stream received from the symbol demapper 2355 using forward error correction (FEC) based on a convolution code. Although FIG. 23 shows the decoder 2357 as being part of the communication apparatus in FIG. 23, the decoder 2357 may be provided as a separate element outside the communication apparatus of FIG. 23.

A channel detector 2361 detects an RSSI. The RSSI is a value obtained by measuring a strength of an electric wave of data transferred by neighboring devices. A frame detector 2363 detects an LQI of a communication link. The LQI is a strength between communication links, and may be calculated from the RSSI.

An encoder 2377, for example a convolution encoder, encodes an input signal, and outputs the encoded signal. The encoder 2377 may successfully perform bit error checking using an additional bit. Although FIG. 23 shows the encoder 2377 as being part of the communication apparatus in FIG. 23, the encoder 2377 may be provided as a separate element outside the communication apparatus of FIG. 23. A symbol mapper 2375 performs mapping to appropriately arrange symbols based on a designated modulation scheme. A second modulator 2373, for example, a direct sequence spread spectrum (DSSS) chip modulator, spreads data to a large-scale code flow occupying a full bandwidth of a corresponding channel by multiplying a data bit by a random bit pattern, namely a pseudo-random noise (PN) sequence. Such a scheme has a good noise prevention performance, and provides excellent security because the spread data is very difficult to recover without knowing the pseudo-random noise (PN) sequence. A first modulator 2371, for example an O-QPSK modulator, performs O-QPSK modulation.

A protection unit 2387 prevents an overcurrent from being supplied to a power amplifier 2385. The power amplifier 2385 generates power required by the target. A detector 2383 detects a change in impedance of the target. Additionally, the detector 2383 may detect power input to the power amplifier 2385. A tracking unit 2381 tracks matching impedance between the source and the target. Additionally, the tracking unit 2381 may track a resonant frequency between the source and the target.

In the following description, the term "resonator" used in the discussion of FIGS. 24A through 26B refers to both a source resonator and a target resonator.

Figure 24A:
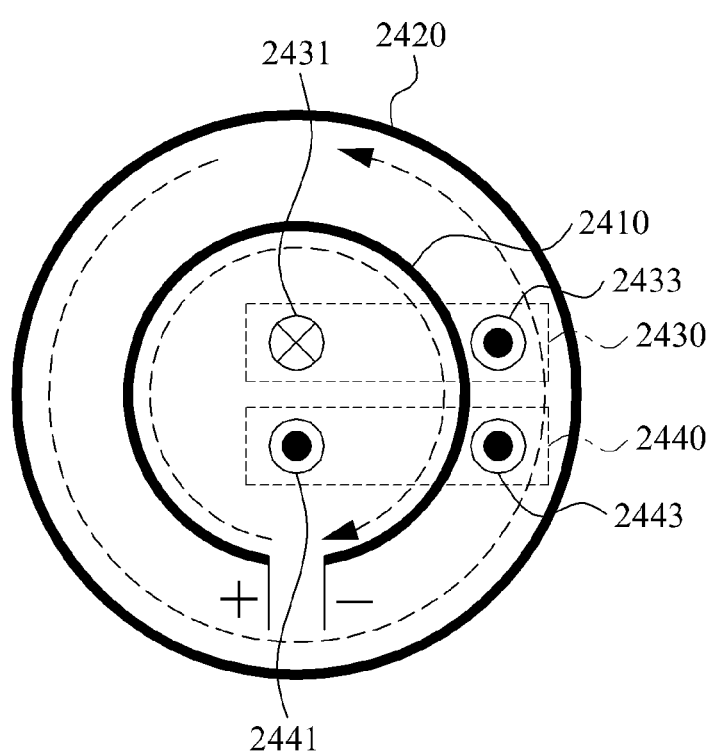
FIGS. 24A through 24B are diagrams illustrating examples of a distribution of a magnetic field in a feeder and a resonator of a wireless power transmission system.
Figure 24B:
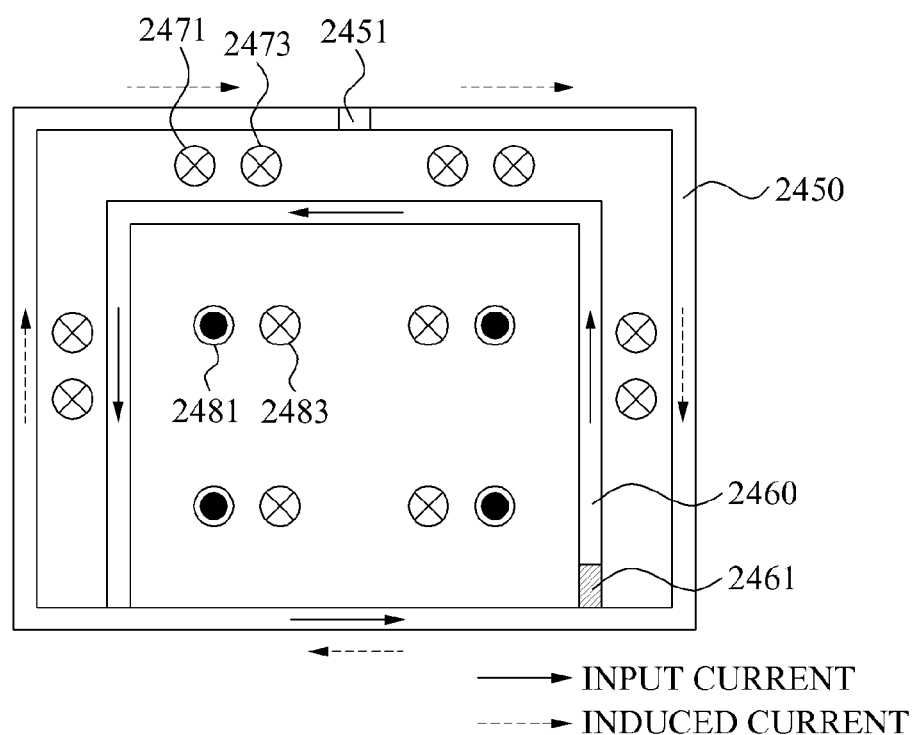

FIGS. 24A and 24B illustrate examples of a distribution of a magnetic field in a feeder and a resonator of a wireless power transmitter. When a resonator receives power supplied through a separate feeder, magnetic fields are formed in both the feeder and the resonator.

FIG. 24A illustrates an example of a structure of a wireless power transmitter in which a feeder 2410 and a resonator 2420 do not have a common ground. Referring to FIG. 24A, as an input current flows into a feeder 2410 through a terminal labeled "+" and out of the feeder 2410 through a terminal labeled "−", a magnetic field 2430 is formed by the input current. A direction 2431 of the magnetic field 2430 inside the feeder 2410 is into the plane of FIG. 24A, and has a phase that is opposite to a phase of a direction 2433 of the magnetic field 2430 outside the feeder 2410. The magnetic field 2430 formed by the feeder 2410 induces a current to flow in a resonator 2420. The direction of the induced current in the resonator 2420 is opposite to a direction of the input current in the feeder 2410 as indicated by the dashed arrows in FIG. 24A.

The induced current in the resonator 2420 forms a magnetic field 2440. Directions of the magnetic field 2440 are the same at all positions inside the resonator 2420. Accordingly, a direction 2441 of the magnetic field 2440 formed by the resonator 2420 inside the feeder 2410 has the same phase as a direction 2443 of the magnetic field 2440 formed by the resonator 2420 outside the feeder 2410.

Consequently, when the magnetic field 2430 formed by the feeder 2410 and the magnetic field 2440 formed by the resonator 2420 are combined, a strength of the total magnetic field inside the resonator 2420 decreases inside the feeder 2410 and increases outside the feeder 2410. In an example in which power is supplied to the resonator 2420 through the feeder 2410 configured as illustrated in FIG. 24A, the strength of the total magnetic field decreases in the center of the resonator 2420, but increases outside the resonator 2420. In another example in which a magnetic field is randomly distributed in the resonator 2420, it is difficult to perform impedance matching since an input impedance will frequently vary. Additionally, when the strength of the total magnetic field increases, an efficiency of wireless power transmission increases. Conversely, when the strength of the total magnetic field is decreases, the efficiency of wireless power transmission decreases. Accordingly, the power transmission efficiency may be reduced on average.

FIG. 24B illustrates an example of a structure of a wireless power transmitter in which a resonator 2450 and a feeder 2460 have a common ground. The resonator 2450 includes a capacitor 2451. The feeder 2460 receives a radio frequency (RF) signal via a port 2461. When the RF signal is input to the feeder 2460, an input current is generated in the feeder 2460. The input current flowing in the feeder 2460 forms a magnetic field, and a current is induced in the resonator 2450 by the magnetic field. Additionally, another magnetic field is formed by the induced current flowing in the resonator 2450. In this example, a direction of the input current flowing in the feeder 2460 has a phase opposite to a phase of a direction of the induced current flowing in the resonator 2450. Accordingly, in a region between the resonator 2450 and the feeder 2460, a direction 2471 of the magnetic field formed by the input current has the same phase as a direction 2473 of the magnetic field formed by the induced current, and thus the strength of the total magnetic field increases in the region between the resonator 2450 and the feeder 2460. Conversely, inside the feeder 2460, a direction 2481 of the magnetic field formed by the input current has a phase opposite to a phase of a direction 2483 of the magnetic field formed by the induced current, and thus the strength of the total magnetic field decreases inside the feeder 2460. Therefore, the strength of the total magnetic field decreases in the center of the resonator 2450, but increases outside the resonator 2450.

An input impedance may be adjusted by adjusting an internal area of the feeder 2460. The input impedance refers to an impedance viewed in a direction from the feeder 2460 to the resonator 2450. When the internal area of the feeder 2460 is increased, the input impedance is increased. Conversely, when the internal area of the feeder 2460 is decreased, the input impedance is decreased. Because the magnetic field is randomly distributed in the resonator 2450 despite a reduction in the input impedance, a value of the input impedance may vary based on a location of a target device. Accordingly, a separate matching network may be required to match the input impedance to an output impedance of a power amplifier. For example, when the input impedance is increased, a separate matching network may be used to match the increased input impedance to a relatively low output impedance of the power amplifier.

Figure 25A:
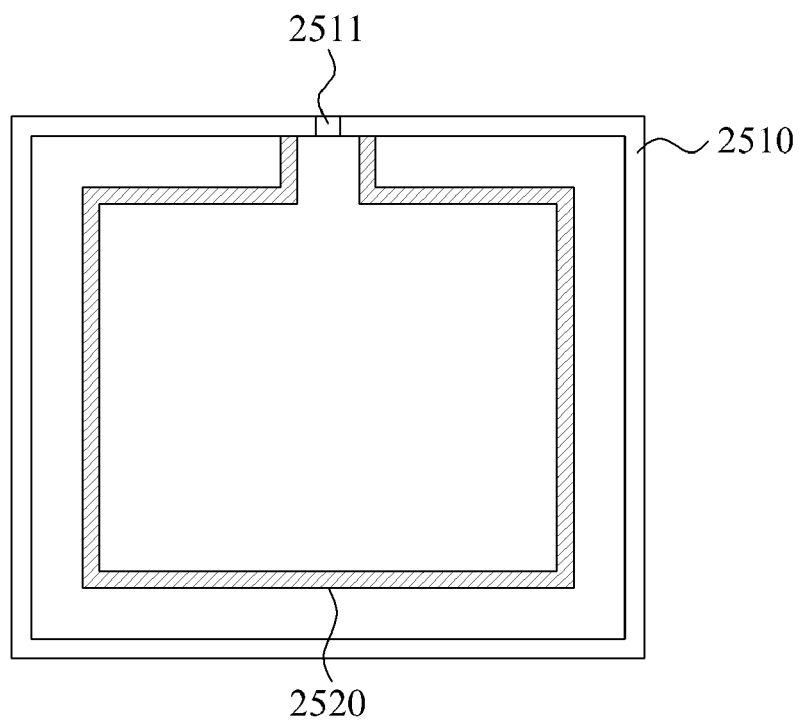
FIGS. 25A and 25B are diagrams illustrating an example of a wireless power transmitter.
Figure 25B:
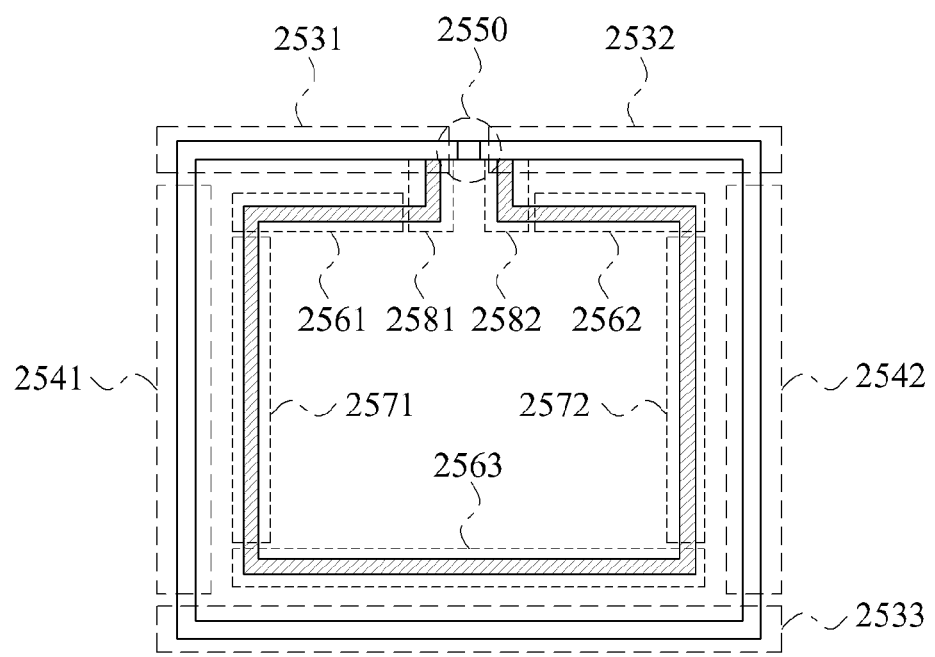

FIGS. 25A and 25B illustrate an example of a wireless power transmitter including a resonator and a feeding unit. Referring to FIG. 25A, the wireless power transmitter includes a resonator 2510 and a feeding unit 2520. The resonator 2510 further includes a capacitor 2511. The feeding unit 2520 is electrically connected to both ends of the capacitor 2511.

FIG. 25B illustrates, in greater detail, a structure of the wireless power transmitter of FIG. 25A. The resonator 2510 includes a first transmission line (not identified by a reference numeral in FIG. 25B, but formed by various elements in FIG. 25B as discussed below), a first conductor 2541, a second conductor 2542, and at least one capacitor 2550.

The capacitor 2550 is inserted in series between a first signal conducting portion 2531 and a second signal conducting portion 2532, causing an electric field to be confined within the capacitor 2550. Generally, a transmission line includes at least one conductor in an upper portion of the transmission line, and at least one conductor in a lower portion of first transmission line. A current may flow through the at least one conductor disposed in the upper portion of the first transmission line, and the at least one conductor disposed in the lower portion of the first transmission line may be electrically grounded. In this example, a conductor disposed in an upper portion of the first transmission line in FIG. 25B is separated into two portions that will be referred to as the first signal conducting portion 2531 and the second signal conducting portion 2532. A conductor disposed in a lower portion of the first transmission line in FIG. 25B will be referred to as a first ground conducting portion 2533.

As illustrated in FIG. 25B, the resonator 2510 has a generally two-dimensional (2D) structure. The first transmission line includes the first signal conducting portion 2531 and the second signal conducting portion 2532 in the upper portion of the first transmission line, and includes the first ground conducting portion 2533 in the lower portion of the first transmission line. The first signal conducting portion 2531 and the second signal conducting portion 2532 are disposed to face the first ground conducting portion 2533. A current flows through the first signal conducting portion 2531 and the second signal conducting portion 2532.

One end of the first signal conducting portion 2531 is connected to one end of the first conductor 2541, the other end of the first signal conducting portion 2531 is connected to the capacitor 2550, and the other end of the first conductor 2541 is connected to one end of the first ground conducting portion 2533. One end of the second signal conducting portion 2532 is connected to one end of the second conductor 2542, the other end of the second signal conducting portion 2532 is connected to the other end of the capacitor 2550, and the other end of the second conductor 2542 is connected to the other end of the ground conducting portion 2533. Accordingly, the first signal conducting portion 2531, the second signal conducting portion 2532, the first ground conducting portion 2533, the first conductor 2541, and the second conductor 2542 are connected to each other, causing the resonator 2510 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

The capacitor 2550 is inserted into an intermediate portion of the first transmission line. In the example in FIG. 25B, the capacitor 2550 is inserted into a space between the first signal conducting portion 2531 and the second signal conducting portion 2532. The capacitor 2550 may be a lumped element capacitor, a distributed capacitor, or any other type of capacitor known to one of ordinary skill in the art. For example, a distributed element capacitor may include a zigzagged conductor line and a dielectric material having a relatively high permittivity disposed between parallel portions of the zigzagged conductor line.

The capacitor 2550 inserted into the first transmission line may cause the resonator 2510 to have a characteristic of a metamaterial. A metamaterial is a material having a predetermined electrical property that is not found in nature, and thus may have an artificially designed structure. All materials existing in nature have a magnetic permeability and permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial that has a magnetic permeability and/or a permittivity that is not found in nature, and may be classified into an epsilon negative (ENG) material, a mu negative (MNG) material, a double negative (DNG) material, a negative refractive index (NRI) material, a left-handed (LH) material, and other metamaterial classifications known to one of ordinary skill in the art based on a sign of the magnetic permeability of the metamaterial and a sign of the permittivity of the metamaterial.

If the capacitor 2550 is a lumped element capacitor and a capacitance of the capacitor 2550 is appropriately determined, the resonator 2510 may have a characteristic of a metamaterial. If the resonator 2510 is caused to have a negative magnetic permeability by appropriately adjusting the capacitance of the capacitor 2550, the resonator 2510 may also be referred to as an MNG resonator. Various criteria may be applied to determine the capacitance of the capacitor 2550. For example, the various criteria may include a criterion for enabling the resonator 2510 to have the characteristic of the metamaterial, a criterion for enabling the resonator 2510 to have a negative magnetic permeability at a target frequency, a criterion for enabling the resonator 2510 to have a zeroth order resonance characteristic at the target frequency, and any other suitable criterion. Based on any one or any combination of the aforementioned criteria, the capacitance of the capacitor 2550 may be appropriately determined.

The resonator 2510, hereinafter referred to as the MNG resonator 2510, may have a zeroth order resonance characteristic of having a resonant frequency when a propagation constant is "0". If the MNG resonator 2510 has the zeroth order resonance characteristic, the resonant frequency is independent of a physical size of the MNG resonator 2510. By changing the capacitance of the capacitor 2550, the resonant frequency of the MNG resonator 2510 may be changed without changing the physical size of the MNG resonator 2510.

In a near field, the electric field is concentrated in the capacitor 2550 inserted into the first transmission line, causing the magnetic field to become dominant in the near field. The MNG resonator 2510 has a relatively high Q-factor when the capacitor 2550 is a lumped element, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated in FIG. 25B, a magnetic core passing through the MNG resonator 2510 may be provided to increase a power transmission distance.

Referring to FIG. 25B, the feeding unit 2520 includes a second transmission line (not identified by a reference numeral in FIG. 25B, but formed by various elements in FIG. 25B as discussed below), a third conductor 2571, a fourth conductor 2572, a fifth conductor 2581, and a sixth conductor 2582.

The second transmission line includes a third signal conducting portion 2561 and a fourth signal conducting portion 2562 in an upper portion of the second transmission line, and includes a second ground conducting portion 2563 in a lower portion of the second transmission line. The third signal conducting portion 2561 and the fourth signal conducting portion 2562 are disposed to face the second ground conducting portion 2563. A current flows through the third signal conducting portion 2561 and the fourth signal conducting portion 2562.

One end of the third signal conducting portion 2561 is connected to one end of the third conductor 2571, the other end of the third signal conducting portion 2561 is connected to one end of the fifth conductor 2581, and the other end of the third conductor 2571 is connected to one end of the second ground conducting portion 2563. One end of the fourth signal conducting portion 2562 is connected to one end of the fourth conductor 2572, the other end of the fourth signal conducting portion 2562 is connected to one end the sixth conductor 2582, and the other end of the fourth conductor 2572 is connected to the other end of the second ground conducting portion 2563. The other end of the fifth conductor 2581 is connected to the first signal conducting portion 2531 at or near where the first signal conducting portion 2531 is connected to one end of the capacitor 2550, and the other end of the sixth conductor 2582 is connected to the second signal conducting portion 2532 at or near where the second signal conducting portion 2532 is connected to the other end of the capacitor 2550. Thus, the fifth conductor 2581 and the sixth conductor 2582 are connected in parallel to both ends of the capacitor 2550. The fifth conductor 2581 and the sixth conductor 2582 are used as an input port to receive an RF signal as an input.

Accordingly, the third signal conducting portion 2561, the fourth signal conducting portion 2562, the second ground conducting portion 2563, the third conductor 2571, the fourth conductor 2572, the fifth conductor 2581, the sixth conductor 2582, and the resonator 2510 are connected to each other, causing the resonator 2510 and the feeding unit 2520 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

If an RF signal is input to the fifth conductor 2581 or the sixth conductor 2582, input current flows through the feeding unit 2520 and the resonator 2510, generating a magnetic field that induces a current in the resonator 2510. A direction of the input current flowing through the feeding unit 2520 is identical to a direction of the induced current flowing through the resonator 2510, thereby causing a strength of a total magnetic field to increase in the center of the resonator 2510, and decrease near the outer periphery of the resonator 2510.

An input impedance is determined by an area of a region between the resonator 2510 and the feeding unit 2520. Accordingly, a separate matching network used to match the input impedance to an output impedance of a power amplifier may not be necessary. However, if a matching network is used, the input impedance may be adjusted by adjusting a size of the feeding unit 2520, and accordingly a structure of the matching network may be simplified. The simplified structure of the matching network may reduce a matching loss of the matching network.

The second transmission line, the third conductor 2571, the fourth conductor 2572, the fifth conductor 2581, and the sixth conductor 2582 of the feeding unit may have a structure identical to the structure of the resonator 2510. For example, if the resonator 2510 has a loop structure, the feeding unit 2520 may also have a loop structure. As another example, if the resonator 2510 has a circular structure, the feeding unit 2520 may also have a circular structure.

Figure 26A:
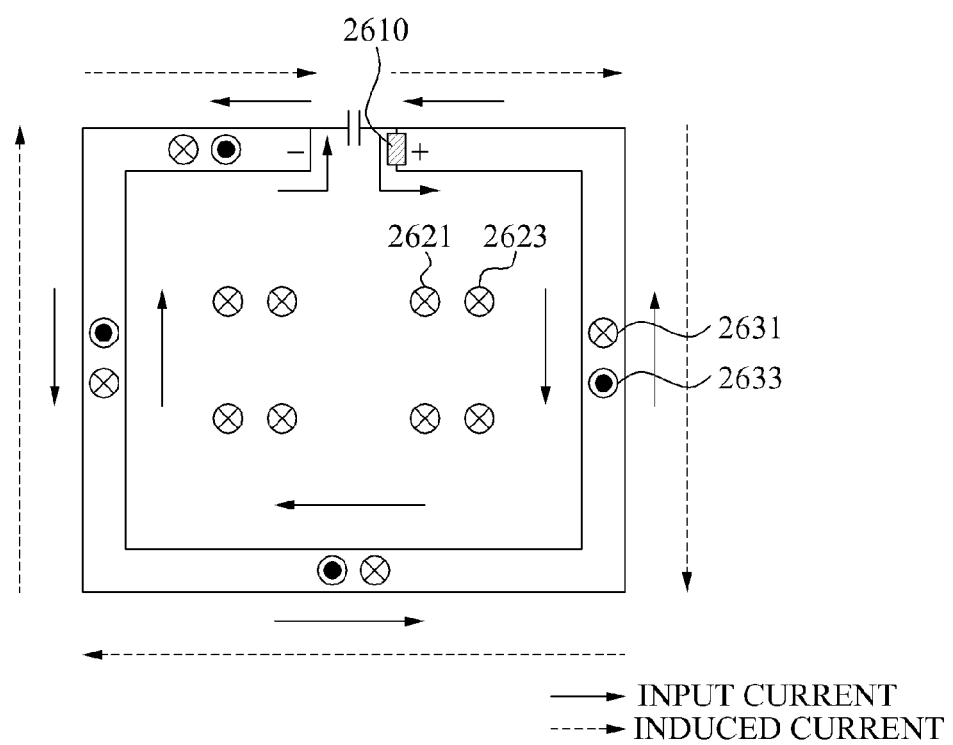
FIG. 26A is a diagram illustrating an example of a distribution of a magnetic field inside a resonator produced by feeding of a feeding unit.

FIG. 26A illustrates an example of a distribution of a magnetic field inside a resonator produced by feeding of a feeding unit. FIG. 26A more simply illustrates the resonator 2510 and the feeding unit 2520 of FIGS. 25A and 25B, and the names of the various elements in FIG. 25B will be used in the following description of FIG. 26A without reference numerals.

A feeding operation may be an operation of supplying power to a source resonator in wireless power transmission, or an operation of supplying AC power to a rectification unit in wireless power transmission. FIG. 26A illustrates a direction of input current flowing in the feeding unit, and a direction of induced current flowing in the source resonator. Additionally, FIG. 26A illustrates a direction of a magnetic field formed by the input current of the feeding unit, and a direction of a magnetic field formed by the induced current of the source resonator.

Referring to FIG. 26A, the fifth conductor or the sixth conductor of the feeding unit 2520 may be used as an input port 2610. In FIG. 26A, the sixth conductor of the feeding unit is being used as the input port 2610. An RF signal is input to the input port 2610. The RF signal may be output from a power amplifier. The power amplifier may increase and decrease an amplitude of the RF signal based on a power requirement of a target device. The RF signal input to the input port 2610 is represented in FIG. 26A as an input current flowing in the feeding unit. The input current flows in a clockwise direction in the feeding unit along the second transmission line of the feeding unit. The fifth conductor and the sixth conductor of the feeding unit are electrically connected to the resonator. More specifically, the fifth conductor of the feeding unit is connected to the first signal conducting portion of the resonator, and the sixth conductor of the feeding unit is connected to the second signal conducting portion of the resonator. Accordingly, the input current flows in both the resonator and the feeding unit. The input current flows in a counterclockwise direction in the resonator along the first transmission line of the resonator. The input current flowing in the resonator generates a magnetic field, and the magnetic field induces a current in the resonator due to the magnetic field. The induced current flows in a clockwise direction in the resonator along the first transmission line of the resonator. The induced current in the resonator transfers energy to the capacitor of the resonator, and also generates a magnetic field. In FIG. 26A, the input current flowing in the feeding unit and the resonator is indicated by solid lines with arrowheads, and the induced current flowing in the resonator is indicated by dashed lines with arrowheads.

A direction of a magnetic field generated by a current is determined based on the right-hand rule. As illustrated in FIG. 26A, within the feeding unit, a direction 2621 of the magnetic field generated by the input current flowing in the feeding unit is identical to a direction 2623 of the magnetic field generated by the induced current flowing in the resonator. Accordingly, a strength of the total magnetic field may increases inside the feeding unit.

In contrast, as illustrated in FIG. 26A, in a region between the feeding unit and the resonator, a direction 2633 of the magnetic field generated by the input current flowing in the feeding unit is opposite to a direction 2631 of the magnetic field generated by the induced current flowing in the source resonator. Accordingly, the strength of the total magnetic field decreases in the region between the feeding unit and the resonator.

Typically, in a resonator having a loop structure, a strength of a magnetic field decreases in the center of the resonator, and increases near an outer periphery of the resonator. However, referring to FIG. 26A, since the feeding unit is electrically connected to both ends of the capacitor of the resonator, the direction of the induced current in the resonator is identical to the direction of the input current in the feeding unit. Since the direction of the induced current in the resonator is identical to the direction of the input current in the feeding unit, the strength of the total magnetic field increases inside the feeding unit, and decreases outside the feeding unit. As a result, due to the feeding unit, the strength of the total magnetic field increases in the center of the resonator having the loop structure, and decreases near an outer periphery of the resonator, thereby compensating for the normal characteristic of the resonator having the loop structure in which the strength of the magnetic field decreases in the center of the resonator, and increases near the outer periphery of the resonator. Thus, the strength of the total magnetic field may be constant inside the resonator.

A power transmission efficiency for transferring wireless power from a source resonator to a target resonator is proportional to the strength of the total magnetic field generated in the source resonator. Accordingly, when the strength of the total magnetic field increases inside the source resonator, the power transmission efficiency also increases.

Figure 26B:
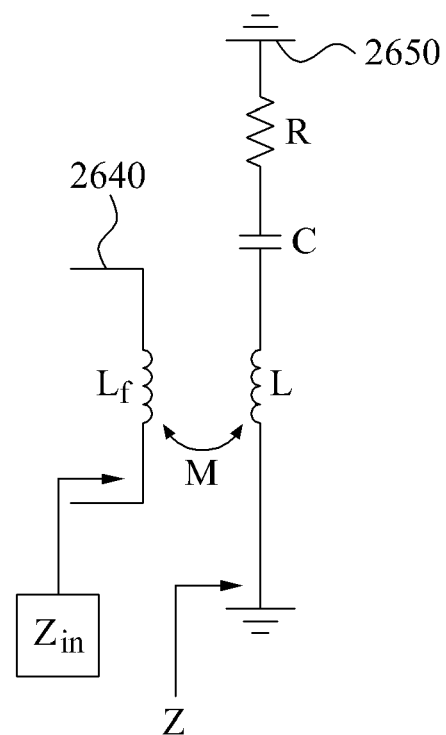
FIG. 26B is a diagram illustrating examples of equivalent circuits of a feeding unit and a resonator.

FIG. 26B illustrates examples of equivalent circuits of a feeding unit and a resonator. Referring to FIG. 26B, a feeding unit 2640 and a resonator 2650 may be represented by the equivalent circuits in FIG. 26B. The feeding unit 2640 is represented as an inductor having an inductance $L_f$, and the resonator 2650 is represented as a series connection of an inductor having an inductance L coupled to the inductance $L_f$ of the feeding unit 2640 by a mutual inductance M, a capacitor having a capacitance C, and a resistor having a resistance R. An example of an input impedance $Z_{in}$ viewed in a direction from the feeding unit 2640 to the resonator 2650 may be expressed by the following Equation 4:

$$Z_{in} = \frac{(\omega M)^2}{Z} \quad \text{[Equation 4]}$$

In Equation 4, M denotes a mutual inductance between the feeding unit 2640 and the resonator 2650, ω denotes a resonant frequency of the feeding unit 2640 and the resonator 2650, and Z denotes an impedance viewed in a direction from the resonator 2650 to a target device. As can be seen from Equation 4, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeding unit 2640 and the resonator 2650. The area of the region between the feeding unit 2640 and the resonator 2650 may be adjusted by adjusting a size of the feeding unit 2640, thereby adjusting the mutual inductance M and the input impedance $Z_{in}$. Since the input impedance $Z_{in}$ may be adjusted by adjusting the size of the feeding unit 2640, it may be unnecessary to use a separate matching network to perform impedance matching with an output impedance of a power amplifier.

In a target resonator and a feeding unit included in a wireless power receiver, a magnetic field may be distributed as illustrated in FIG. 26A. For example, the target resonator may receive wireless power from a source resonator via magnetic coupling. The received wireless power induces a current in the target resonator. The induced current in the target resonator generates a magnetic field, which induces a current in the feeding unit. If the target resonator is connected to the feeding unit as illustrated in FIG. 26A, a direction of the induced current flowing in the target resonator will be identical to a direction of the induced current flowing in the feeding unit. Accordingly, for the reasons discussed above in connection with FIG. 26A, a strength of the total magnetic field will increase inside the feeding unit, and will decrease in a region between the feeding unit and the target resonator.

Figure 27:
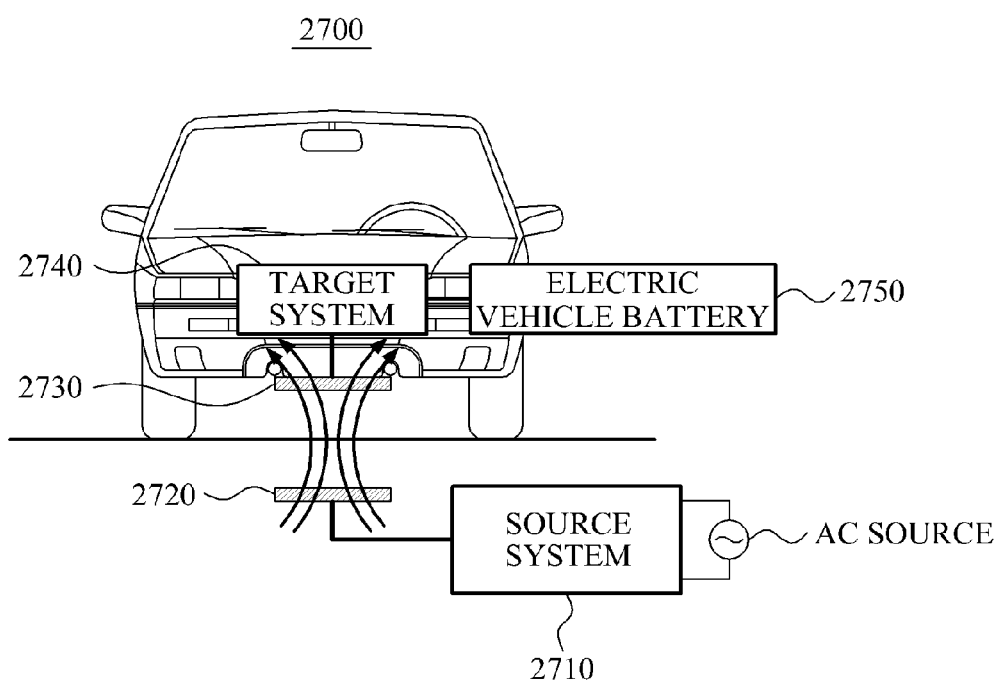
FIG. 27 is a diagram illustrating an example of an electric vehicle charging system.

FIG. 27 is a diagram illustrating an example of an electric vehicle charging system. Referring to FIG. 27, an electric vehicle charging system 2700 includes a source system 2710, a source resonator 2720, a target resonator 2730, a target system 2740, and an electric vehicle battery 2750.

In one example, the electric vehicle charging system 2700 has a structure similar to the structure of the wireless power transmission and charging system of FIG. 1. The source system 2710 and the source resonator 2720 in the electric vehicle charging system 2700 operate as a source. The target resonator 2730 and the target system 2740 in the electric vehicle charging system 2700 operate as a target.

In one example, the source system 2710 includes an alternating current-to-direct current (AC/DC) converter, a power detector, a power converter, a control and communication (control/communication) unit similar to those of the source device 110 of FIG. 1. In one example, the target system 2740 includes a rectification unit, a DC-to-DC (DC/DC) converter, a switch unit, a charging unit, and a control/communication unit similar to those of the target device 120 of FIG. 1. The electric vehicle battery 2750 is charged by the target system 2740. The electric vehicle charging system 2700 may use a resonant frequency in a band of a few kHz to tens of MHz.

The source system 2710 generates power based on a type of the vehicle being charged, a capacity of the electric vehicle battery 2750, and a charging state of the electric vehicle battery 2750, and wirelessly transmits the generated power to the target system 2740 via a magnetic coupling between the source resonator 2720 and the target resonator 2730.

The source system 2710 may control an alignment of the source resonator 2720 and the target resonator 2730. For example, when the source resonator 2720 and the target resonator 2730 are not aligned, the controller of the source system 2710 may transmit a message to the target system 2740 to control the alignment of the source resonator 2720 and the target resonator 2730.

For example, when the target resonator 2730 is not located in a position enabling maximum magnetic coupling, the source resonator 2720 and the target resonator 2730 are not properly aligned. When a vehicle does not stop at a proper position to accurately align the source resonator 2720 and the target resonator 2730, the source system 2710 may instruct a position of the vehicle to be adjusted to control the source resonator 2720 and the target resonator 2730 to be aligned. However, this is just an example, and other methods of aligning the source resonator 2720 and the target resonator 2730 may be used.

The source system 2710 and the target system 2740 may transmit or receive an ID of a vehicle and exchange various messages by performing communication with each other.

The descriptions of FIGS. 2 through 26B are also applicable to the electric vehicle charging system 2700. However, the electric vehicle charging system 2700 may use a resonant frequency in a band of a few kHz to tens of MHz, and may wirelessly transmit power that is equal to or higher than tens of watts to charge the electric vehicle battery 2750.

According to the teachings above, there is provided a wireless power transmission system including a source that selects a channel with little interference by neighboring communication devices, from among channels available for communication, and that transmits a channel seizure signal with a predetermined intensity. When an intensity of the channel seizure signal is greater than a reference value, a target may determine a channel corresponding to the channel seizure signal, to be a communication channel. Thus, it is possible to prevent the target from incorrectly accessing the source.

Additionally, according to various examples, in a wireless power transmission system, a source may transmit an access standard instruction, and a target may transmit a response signal only when a reference requested by the access standard instruction is satisfied. Thus, it is possible to prevent a plurality of targets from colliding with each other.

Furthermore, according to various examples, in a wireless power transmission system, a source may compare power used to transmit an instruction via a communication channel, with power received by a target, and may determine whether the target incorrectly accesses the source. Moreover, according to various examples, in a wireless power transmission system, a source may compare wirelessly transmitted power with power transferred to a load of a target, in a charging mode, and may determine whether the target incorrectly accesses the source.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. For example, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments accomplishing the examples disclosed herein can be easily construed by programmers skilled in the art to which the examples pertain based on and using the flow diagrams and block diagrams of the figures and their corresponding descriptions as provided herein.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication apparatus in a wireless power transmission system, the communication apparatus comprising:
    a channel search unit configured to search for communication channels other than a channel used in wireless power transmission, and measure state information of the communication channels;
    a channel determining unit configured to determine a communication channel available for communication with a target device based on the measured state information;
    a communication unit configured to transmit an access instruction to the target device using the determined communication channel; and
    a controller configured to determine whether to communicate with the target device using the determined communication channel based on whether a response signal corresponding to the access instruction is received.

2. The communication apparatus of claim 1, wherein the communication apparatus is configured to:
    detect the target device in a wireless power transmission region of the communication apparatus.

3. The communication apparatus of claim 1, wherein the channel search unit comprises:
    a channel measuring unit configured to measure intensities of interference signals of the respective communication channels.

4. The communication apparatus of claim 3, wherein the channel measuring unit is further configured to:
    measure the intensities for a predetermined period of time.

5. The communication apparatus of claim 3, wherein the channel determining unit is further configured to:

determine a communication channel comprising an intensity of an interference signal that is less than or equal to a predetermined value, among the measured intensities, to be the communication channel available for communication with the target device.

6. The communication apparatus of claim 3, wherein the channel determining unit is further configured to:
determine a communication channel comprising an intensity of an interference signal that is lowest in value, among the measured intensities, to be the communication channel available for communication with the target device if each of the intensities are greater than or equal to a channel selection reference level.

7. The communication apparatus of claim 1, wherein the communication unit is further configured to:
transmit a channel seizure signal to the target device, the channel seizure signal comprising a predetermined intensity.

8. The communication apparatus of claim 7, wherein the channel seizure signal is a continuous wave (CW) signal comprising a predetermined intensity and a power greater than a communication signal of a direct-sequence spread spectrum (DSSS).

9. The communication apparatus of claim 1, wherein the controller is further configured to:
assign a control identifier (ID) to the target device if the response signal is received.

10. The communication apparatus of claim 1, wherein the communication unit is further configured to:
transmit a signal to request information on a power required by the target device using a communication frequency of the determined communication channel.

11. The communication apparatus of claim 10, wherein the controller is further configured to:
determine an amount of a wireless power to be transmitted by the communication apparatus based on the information regarding the power required by the target device; and
control a wireless power output from the communication apparatus based on the determined amount of the wireless power.

12. The communication apparatus of claim 1, wherein the channel search unit is further configured to:
search for the communication channels based on a search table set based on a type of the communication apparatus, or a unique ID assigned to the communication apparatus.

13. The communication apparatus of claim 1, wherein the controller is further configured to:
control the channel search unit to search for the communication channels, regardless of whether the target device is waked up.

14. The communication apparatus of claim 1, wherein the controller is further configured to:
determine whether the communication apparatus is accessed by the target device based on information on a power of a communication output of the communication apparatus in the determined communication channel, and information on a power of the communication output received by the target device.

15. The communication apparatus of claim 14, wherein the controller is further configured to:
control the channel search unit to search for the communication channels based on a channel search start command if the communication apparatus is not accessed by the target device; and control the channel search unit to search for the communication channels based on an amount of a change in a current output from the communication apparatus if the communication apparatus is accessed by the target device.

16. The communication apparatus of claim 1, wherein the controller is further configured to:
determine a difference between a wireless power transmitted by the communication apparatus and a power transferred to a load of the target device; and
determine whether the target device incorrectly accesses the communication apparatus based on the determined difference.

17. The communication apparatus of claim 1, wherein the controller is further configured to:
determine a difference between a time in which an amount of a wireless power transmitted by the communication apparatus is changed to a predetermined value, and a time in which an amount of a power transferred to a load of the target device is changed; and
determine whether the target device incorrectly accesses the communication apparatus based on the determined difference.

18. The communication apparatus of claim 1, wherein the controller is further configured to:
determine a power of a communication output in the determined communication channel based on a table to which an intensity of an interference signal in the determined communication channel, and a power of an output signal required to transmit data within a predetermined error range, are mapped.

19. The communication apparatus of claim 1, wherein the controller is further configured to:
determine a time required to measure intensities of interference signals of the respective communication channels.

20. The communication apparatus of claim 1, wherein the controller is further configured to:
determine to change the determined communication channel to another communication channel if an error in the determined communication channel between the communication apparatus and the target device is greater than a predetermined value, or if an intensity of an interference signal of the determined communication channel is greater than a predetermined value; and
transmit a channel change request instruction to the target device.

21. A communication apparatus in a wireless power transmission system, the communication apparatus comprising:
a channel search unit configured to search for communication channels other than a channel used in wireless power transmission, and measure state information of the communication channels;
a channel determining unit configured to determine a communication channel available for communication with a source device based on the measured state information; and
a controller configured to determine whether to communicate with the source device using the determined communication channel based on whether an access instruction is received from the source device using the determined communication channel.

22. The communication apparatus of claim 21, wherein the controller is configured to:
determine whether the access instruction is received from the source device using the determined communication channel within a reference time.

23. The communication apparatus of claim 22, further comprising:
a communication unit configured to transmit, to the source device, a response signal corresponding to the access instruction if the access instruction is received within the reference time.

24. The communication apparatus of claim 23, wherein the communication unit is further configured to:
receive, from the source device, a control ID assigned to the communication apparatus and that corresponds to the response signal.

25. The communication apparatus of claim 22, wherein the channel search unit is further configured to:
search for another communication channel, and measure state information of the other communication channel, if the access instruction is not received within the reference time.

26. The communication apparatus of claim 21, wherein:
the channel search unit is further configured to measure intensities of channel seizure signals of the respective communication channels that are transmitted by the source device; and
the channel determining unit is further configured to determine a communication channel comprising an intensity of a channel seizure signal that is greater than a predetermined value, among the intensities, to be the communication channel available for communication with the source device.

27. The communication apparatus of claim 26, wherein the channel seizure signal is a continuous wave (CW) signal comprising a predetermined intensity and a power greater than a communication signal of a direct-sequence spread spectrum (DSSS).

28. The communication apparatus of claim 21, wherein:
the communication apparatus is configured to receive channel seizure signals from source devices; and
the controller is further configured to select one of the source devices using a communication channel comprising an intensity of a channel seizure signal that is greatest in value, from among the source devices, and determine to receive a wireless power from the selected one of the source devices.

29. The communication apparatus of claim 28, wherein the channel determining unit is further configured to:
determine the communication channel used by the selected one of the source devices to be a communication channel available for communication with the selected one of the source devices.

30. The communication apparatus of claim 21, wherein the channel search unit is further configured to:
search for the communication channels based on a search table set based on a type of the communication apparatus, or a unique ID assigned to the communication apparatus.

31. The communication apparatus of claim 21, further comprising:
a direct current (DC)-to-DC (DC/DC) converter; and
a load,
wherein the controller is further configured to determine a power required by the communication apparatus based on a power measured at an input end of the DC/DC converter, a power measured at an output end of the DC/DC converter, and a power transferred to the load.

32. A communication method in a wireless power transmission system, the communication method comprising:
searching for communication channels other than a channel used in wireless power transmission;
measuring state information of the communication channels;
determining a communication channel available for communication with a target device based on the measured state information;
transmitting an access instruction to the target device using the determined communication channel; and
determining whether to communicate with the target device using the determined communication channel based on whether a response signal corresponding to the access instruction is received.

33. The communication method of 32, further comprising:
transmitting a channel seizure signal to the target device, the channel seizure signal comprising a predetermined intensity.

34. The communication method of claim 32, wherein the measuring of the state information comprises:
measuring intensities of interference signals of the respective communication channels.

35. The communication method of claim 34, wherein the determining of the communication channel comprises:
determining a communication channel comprising an intensity of an interference signal that is less than or equal to a predetermined value, among the measured intensities, to be the communication channel available for communication with the target device.

36. A communication method in a wireless power transmission system, the communication method comprising:
searching for communication channels other than a channel used in wireless power transmission;
measuring state information of the communication channels;
determining a communication channel available for communication with a source device based on the measured state information; and
determining whether to communicate with the source device using the determined communication channel based on whether an access instruction is received from the source device using the determined communication channel.

* * * * *